United States Patent [19]

Ohshima

[11] Patent Number: 5,598,544
[45] Date of Patent: Jan. 28, 1997

[54] INSTRUCTION BUFFER DEVICE FOR PROCESSING AN INSTRUCTION SET OF VARIABLE-LENGTH INSTRUCTION CODES

[75] Inventor: Toshiharu Ohshima, Kawasaki, Japan

[73] Assignee: Fujitsu Limited, Kawasaki, Japan

[21] Appl. No.: 861,786

[22] PCT Filed: Oct. 18, 1991

[86] PCT No.: PCT/JP91/01430

§ 371 Date: Jun. 16, 1992

§ 102(e) Date: Jun. 16, 1992

[87] PCT Pub. No.: WO92/07320

PCT Pub. Date: Apr. 30, 1992

[30] Foreign Application Priority Data

Oct. 20, 1990 [JP] Japan ................... 2-283066

[51] Int. Cl.$^6$ ................................................ G06F 9/30
[52] U.S. Cl. .......................... 398/380; 364/259.9
[58] Field of Search .............................. 395/375, 800

[56] References Cited

U.S. PATENT DOCUMENTS

| | | | |
|---|---|---|---|
| 3,275,989 | 9/1966 | Glaser et al. | 395/425 |
| 4,037,213 | 7/1977 | Atkins et al. | 395/375 |
| 4,689,765 | 8/1987 | Hooper | 395/775 |
| 4,916,606 | 4/1990 | Yamaoka et al. | 395/375 |
| 4,945,511 | 7/1990 | Itomitsu et al. | 395/375 |
| 5,051,940 | 9/1991 | Vassiliadis et al. | 364/736 |
| 5,117,488 | 5/1992 | Noguchi et al. | 395/375 |
| 5,168,571 | 12/1992 | Hoover et al. | 395/800 |
| 5,179,691 | 1/1993 | O'Brien et al. | 395/500 |
| 5,202,967 | 4/1993 | Matsuzaki et al. | 395/375 |
| 5,233,696 | 8/1993 | Suzuki | 395/375 |
| 5,249,273 | 9/1993 | Yoshitake et al. | 395/375 |

FOREIGN PATENT DOCUMENTS

| | | |
|---|---|---|
| 0113178 | 7/1984 | European Pat. Off. . |
| 45-2634 | 1/1970 | Japan . |
| 51-78655 | 7/1976 | Japan . |
| 55-10626 | 1/1980 | Japan . |
| 56-63652 | 5/1981 | Japan . |
| 59-154546 | 9/1984 | Japan . |
| 3-144732 | 6/1991 | Japan . |

OTHER PUBLICATIONS

"Opcode Remap and Compression in Hard–Wired RISC Microprocessor," *IBM Tecnical Disclosure Bulletin*, vol. 32, No. 10A, Mar. 1990, New York, NY, p. 349.

Kaneko et al., "Realizing the V80 and Its System Support Functions," *IEEE MICRO*, vol. 10, No. 2, Apr. 1990, New York, NY, pp. 56–69.

*Primary Examiner*—Krisna Lim
*Attorney, Agent, or Firm*—Staas & Halsey

[57] ABSTRACT

An instruction buffer device that can simultaneously process a plurality of instruction code strings having at least one basic segment, each basic having an associated variable length expanded segment. The length of the basic segment and the expanded segment are multiples of a predetermined unit length. The instruction buffer device further has an instruction buffer including a marking device for marking each unit length of the instruction code string as either a basic segment or an expanded segment; a code storage device for reading and storing the instruction code string; a marking storage device for storing the marking; and an output selection circuit for selecting a predetermined instruction code string from the code storage device for outputting. An instruction decoder, and a bus divided into a plurality of mutually distinct fields for connecting the instruction buffer device and the instruction decoder are also provided. The instruction buffer further identifies the leading position of the instruction code string to be output to the instruction decoder. A control circuit is provided that controls the coupling of one or more codes in the portions in the code string, beginning at the leading position, indicated as the basic segments by the marking in a length not exceeding a predetermined length for outputting to one of the fields of the bus, and to output the portion of the code string beginning from the leading position indicated as a non basic segment by marking the other field of the bus.

10 Claims, 24 Drawing Sheets

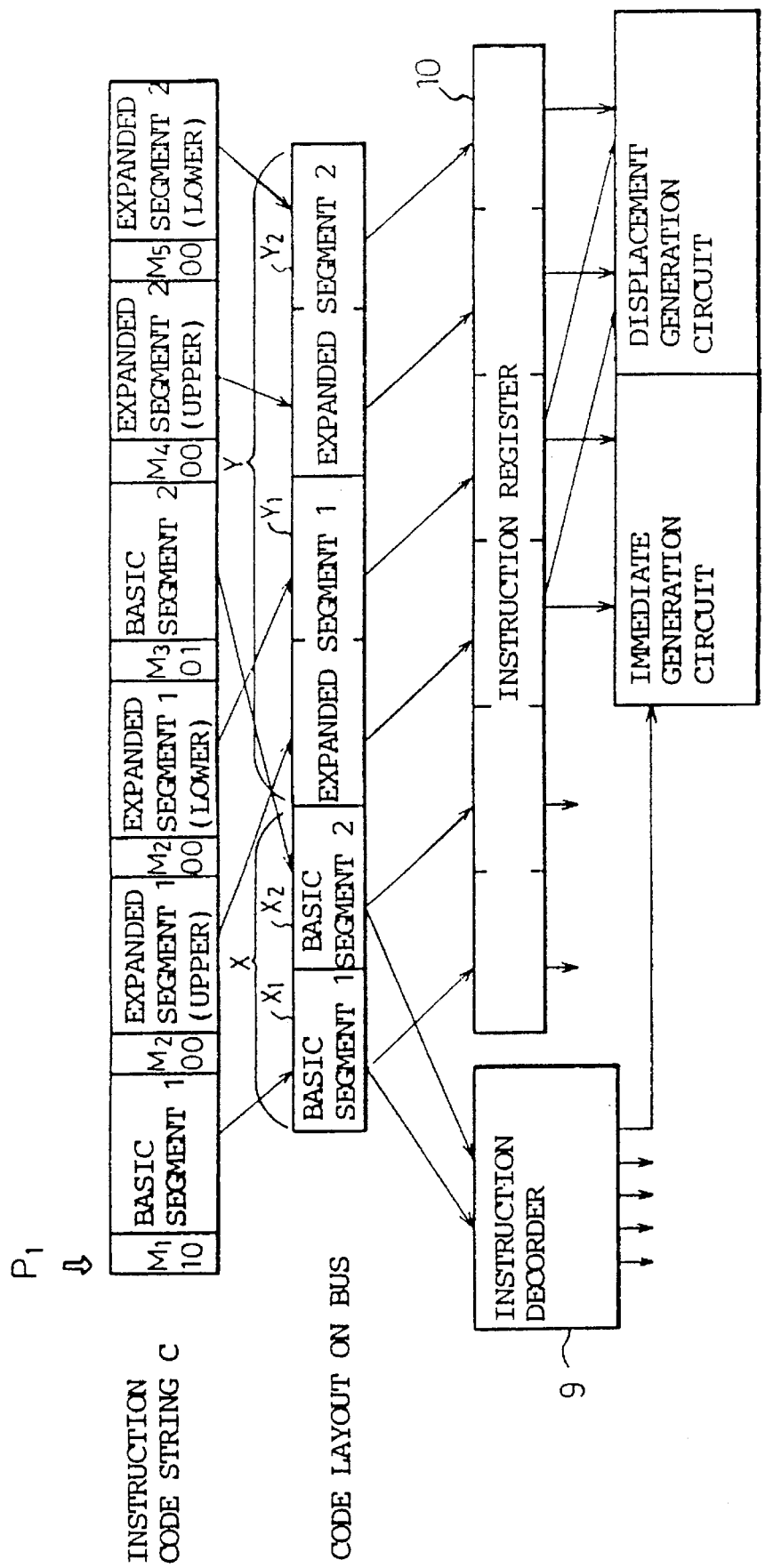

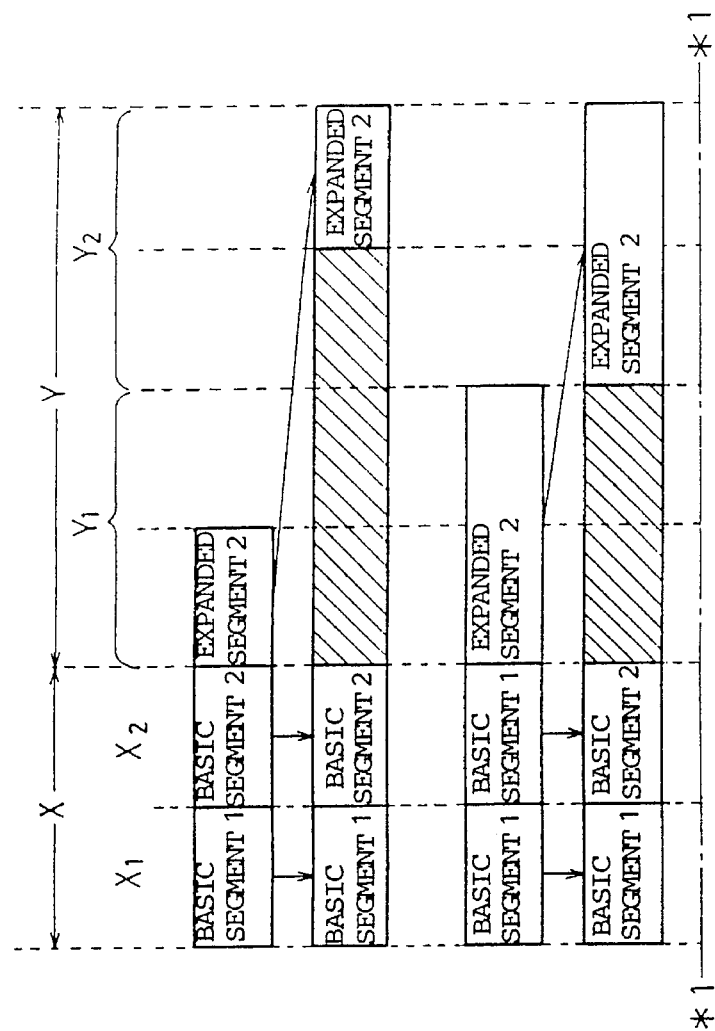
Fig.2(a) REGISTER – MEMORY (16bit disp)
Fig.2(b) REGISTER – MEMORY (32bit disp)

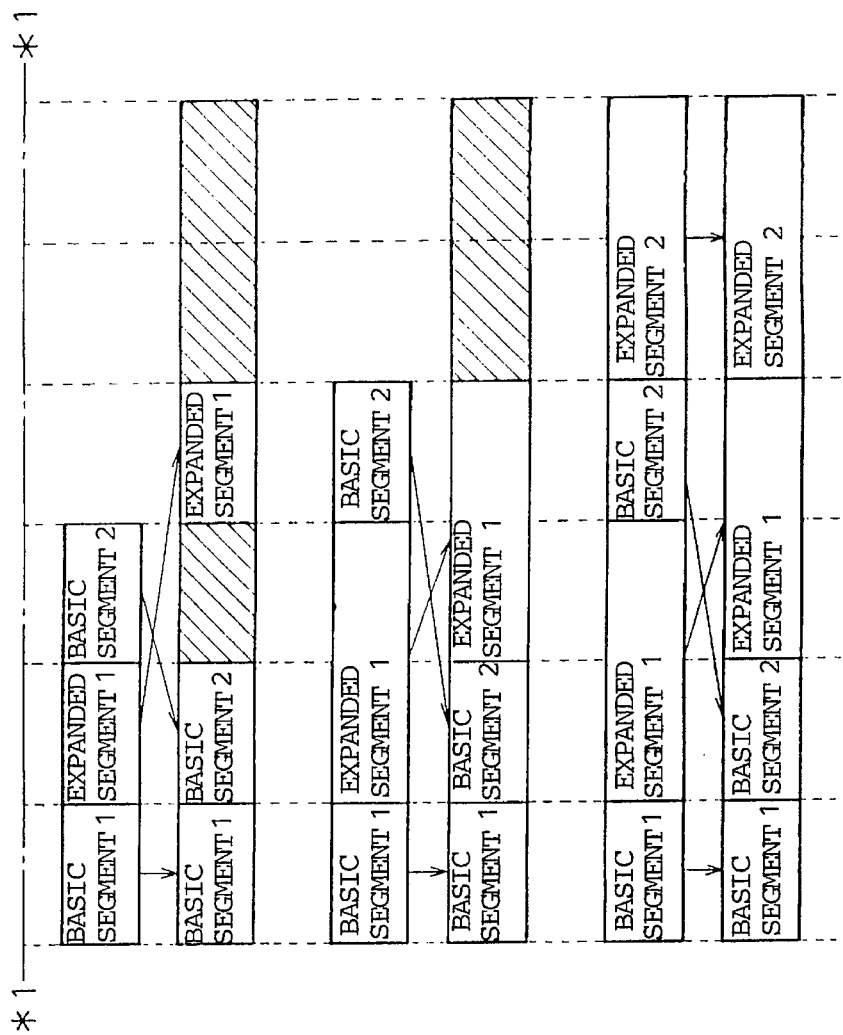
Fig.2(c) IMMEDIATE – REGISTER (16bit)
or MEMORY – REGISTER (16bit disp)
Fig.2(d) IMMEDIATE – REGISTER (32bit)
or MEMORY – REGISTER (32bit disp)
Fig.2(e) IMMEDIATE – MEMORY (32bit disp) (32bit)

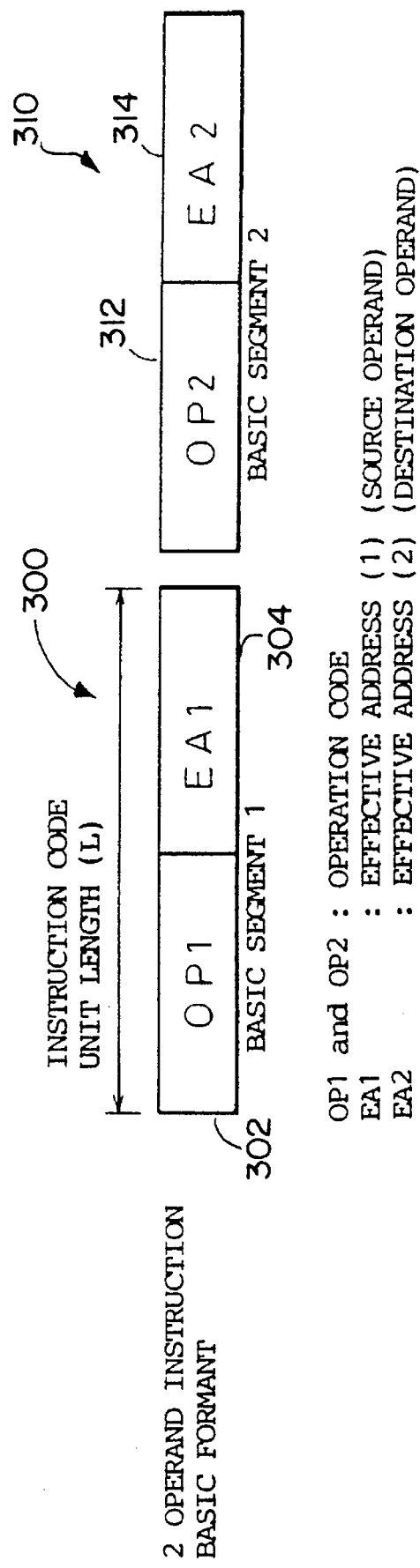

FIG.3B-1 REGISTER – REGISTER

| BASIC SEGMENT 1 reg1 | BASIC SEGMENT 2 reg2 |
|---|---|
| ⊢ L ⊣ | ⊢ n∗L ⊣ |

FIG.3B-2 REGISTER – MEMORY

| BASIC SEGMENT 1 reg1 | BASIC SEGMENT 2 | EXPANDED SEGMENT 2 disp2 |
|---|---|---|
| ⊢ L ⊣ | ⊢ L ⊣ | ⊢ n∗L ⊣ |

FIG.3B-3 MEMORY – REGISTER

| BASIC SEGMENT 1 | EXPANDED SEGMENT 1 disp1 | BASIC SEGMENT 2 reg2 |
|---|---|---|
| ⊢ L ⊣ | ⊢ n∗L ⊣ | ⊢ L ⊣ |

FIG.3B-4 MEMORY – MEMORY

| BASIC SEGMENT 1 | EXPANDED SEGMENT 1 disp1 | BASIC SEGMENT 2 | EXPANDED SEGMENT 2 disp2 |
|---|---|---|---|
| ⊢ L ⊣ | ⊢ n∗L ⊣ | ⊢ L ⊣ | ⊢ n∗L ⊣ |

FIG.3B-5 IMMEDIATE – REGISTER

| BASIC SEGMENT 1 | EXPANDED SEGMENT 1 imm1 | BASIC SEGMENT 2 reg2 |
|---|---|---|
| ⊢ L ⊣ | ⊢ n∗L ⊣ | ⊢ L ⊣ |

FIG.3B-6 IMMEDIATE – MEMORY

| BASIC SEGMENT 1 | EXPANDED SEGMENT 1 imm1 | BASIC SEGMENT 2 | EXPANDED SEGMENT 2 disp2 |
|---|---|---|---|
| ⊢ L ⊣ | ⊢ n∗L ⊣ | ⊢ L ⊣ | ⊢ n∗L ⊣ |

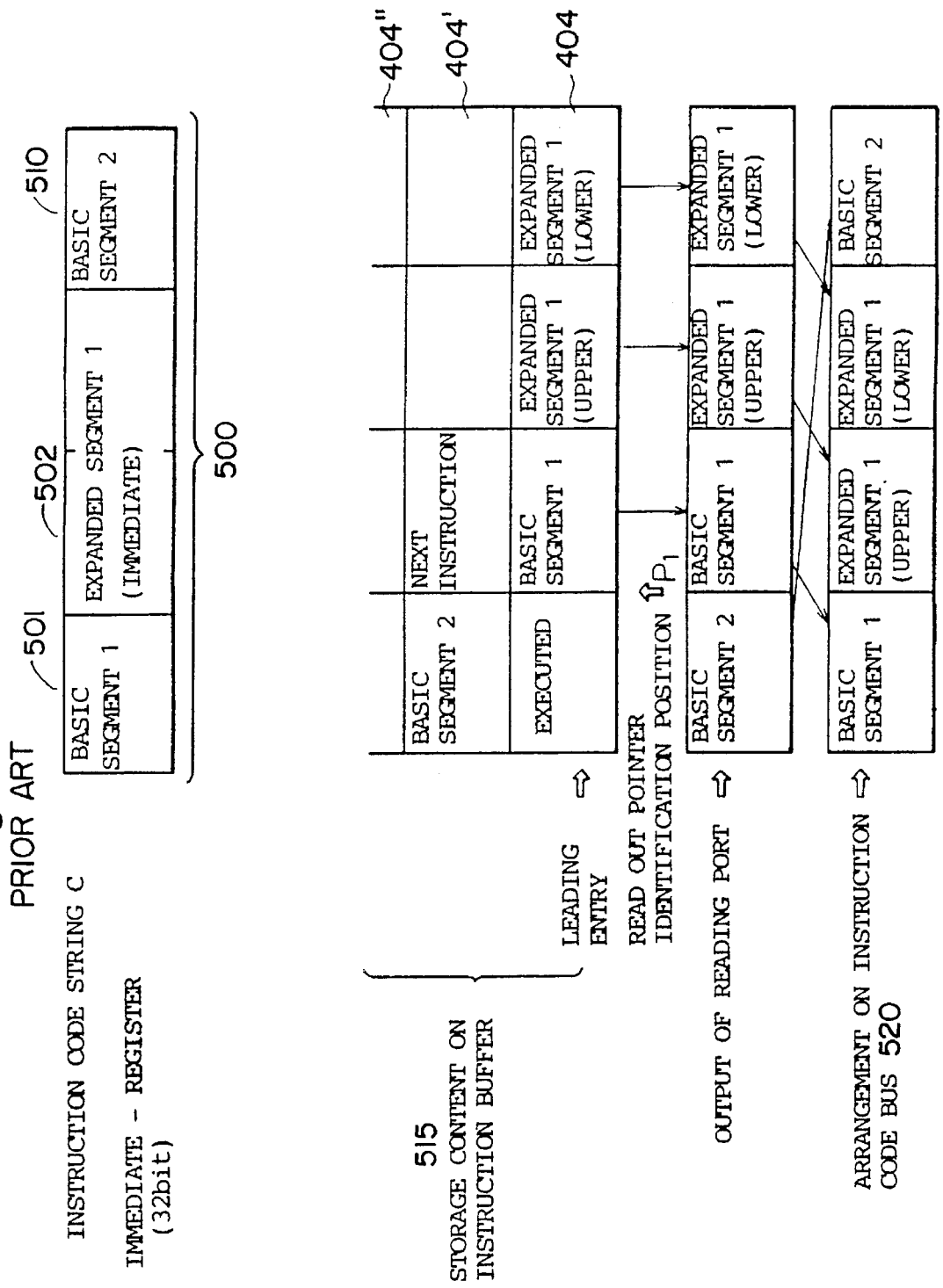

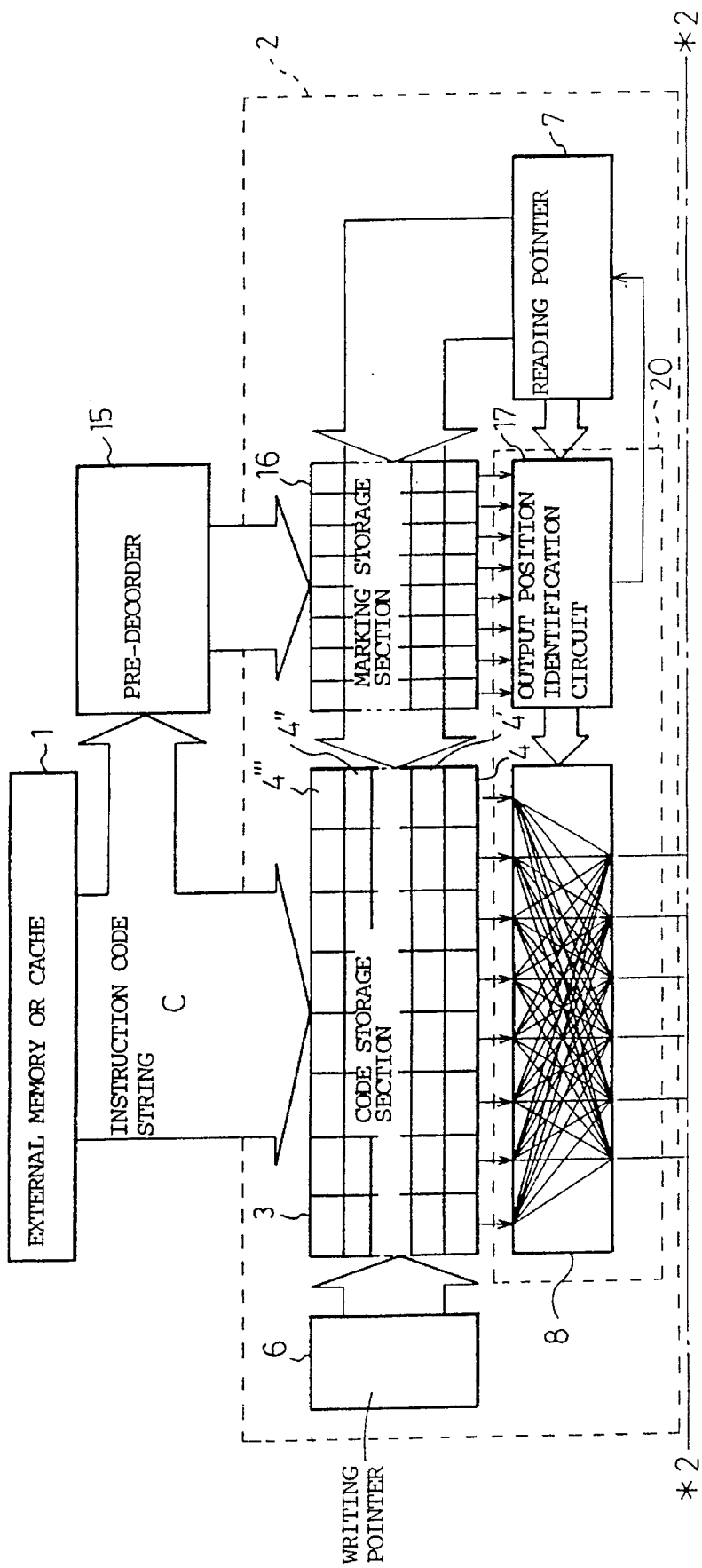

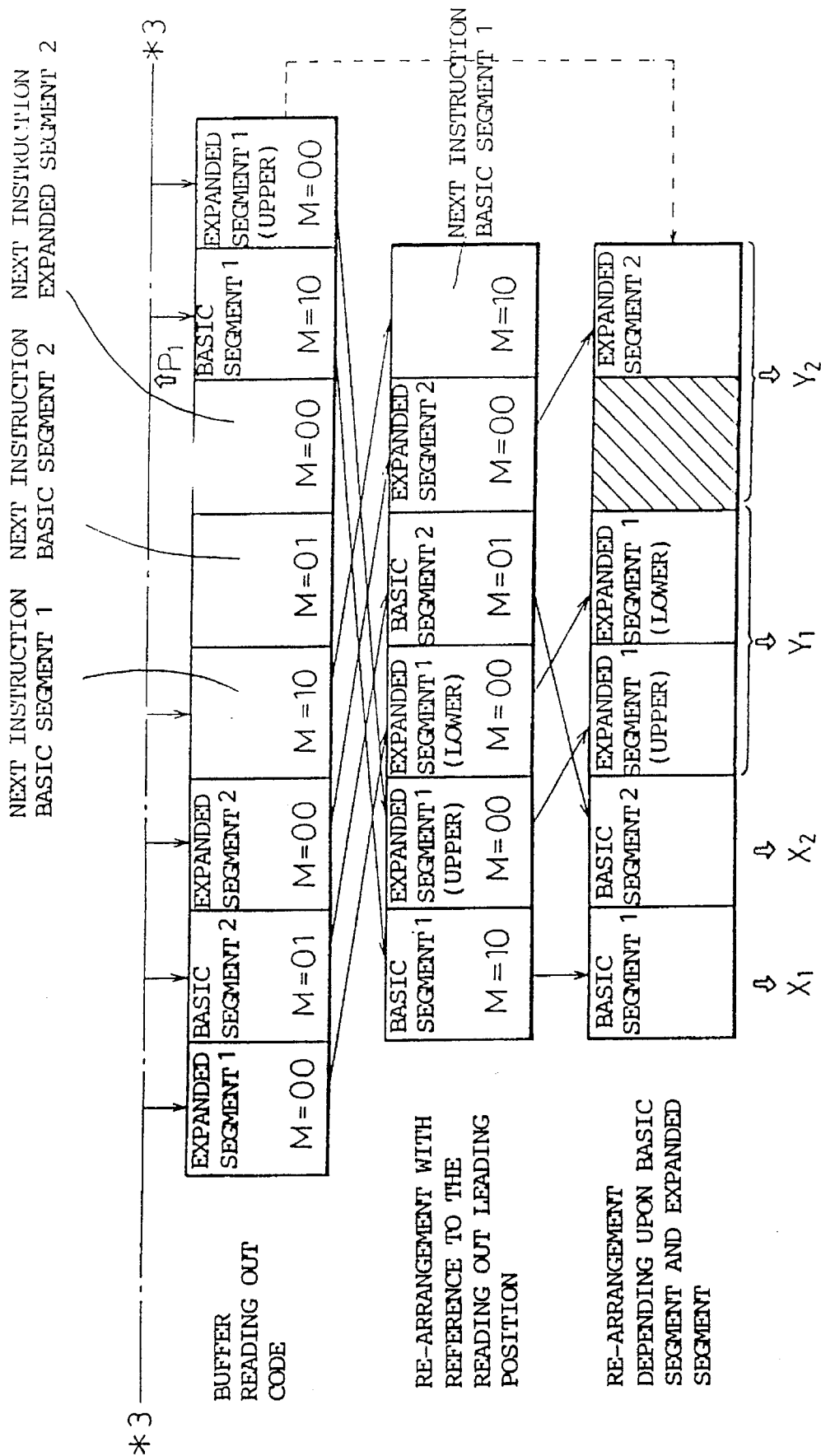

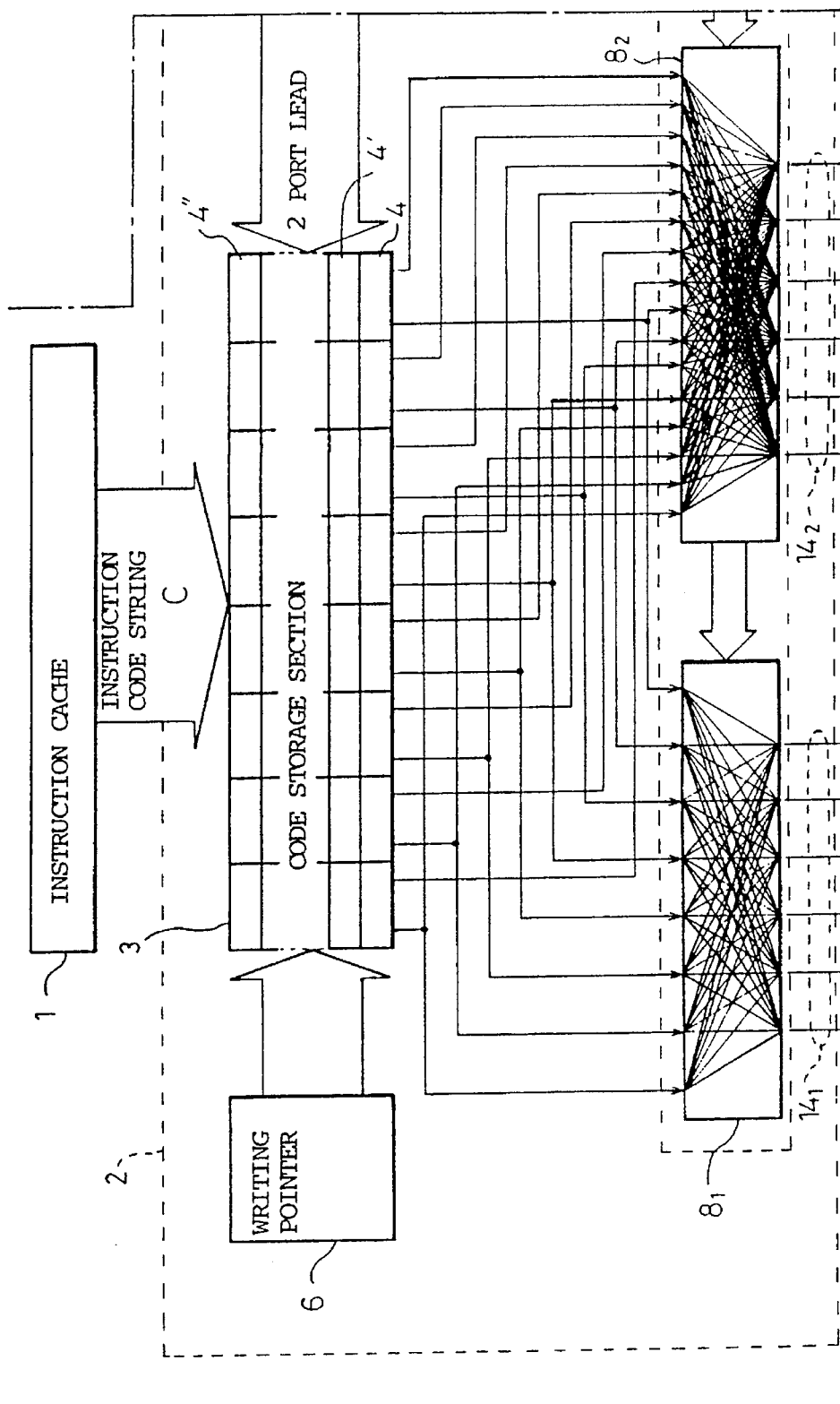

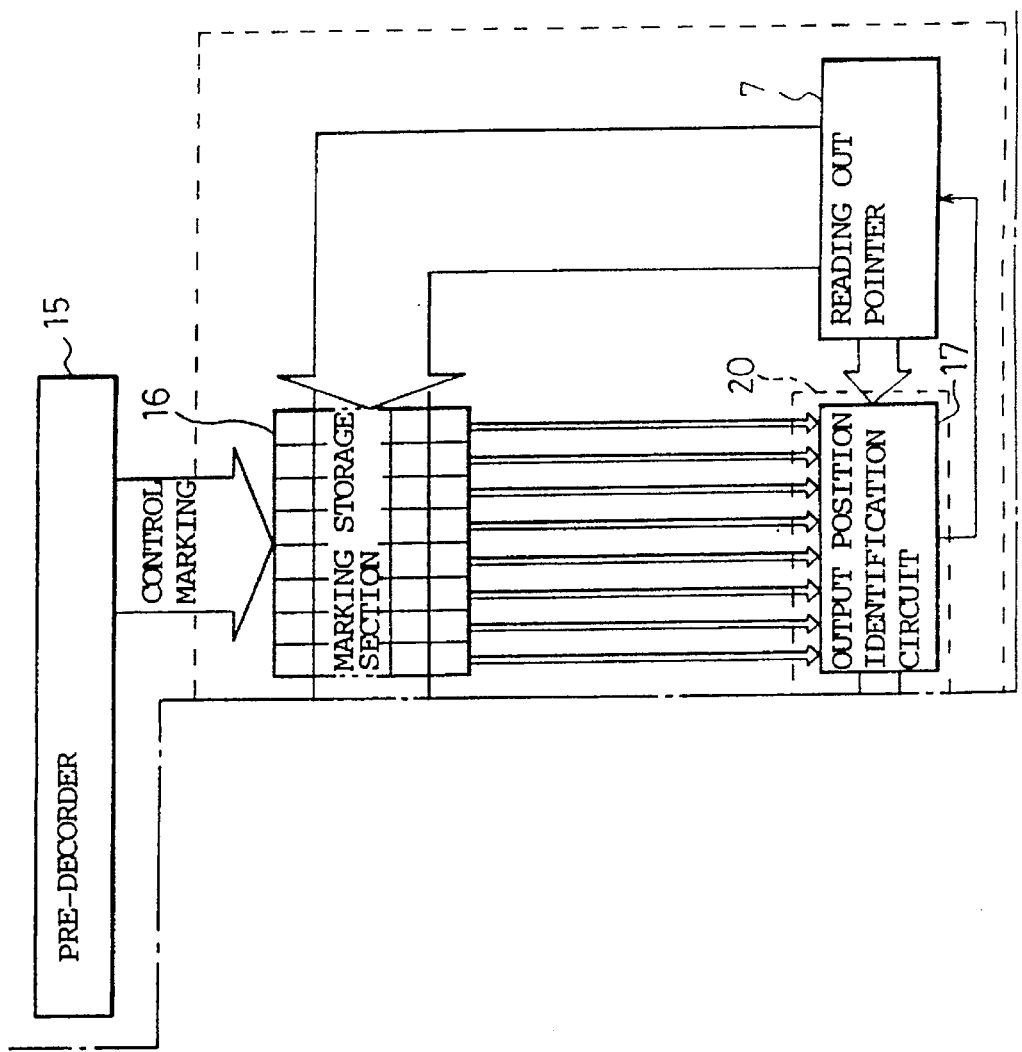

Fig. 9A

EXAMPLE OF INSTRUCTION CODE STRING

INSTRUCTION 1
IMMEDIATE (16 BIT)
→MEMORY (32 BIT, DISPLACEMENT)

| BASIC SEGMENT 1 | EXPANDED SEGMENT 1 (UPPER) | BASIC SEGMENT 2 | EXPANDED SEGMENT 2 (UPPER) | EXPANDED SEGMENT 2 (LOWER) |
|---|---|---|---|---|
| $M_0$ 11 | $M_1$ 00 | $M_2$ 01 | $M_3$ 00 | $M_4$ 00 |

INSTRUCTION 2
MEMORY (32 BIT, DISPLACEMENT)
→MEMORY (32 BIT, DISPLACEMENT)

| BASIC SEGMENT 1 | EXPANDED SEGMENT 1 (UPPER) | EXPANDED SEGMENT 1 (LOWER) | BASIC SEGMENT 2 | EXPANDED SEGMENT 2 (UPPER) | EXPANDED SEGMENT 2 (LOWER) |
|---|---|---|---|---|---|
| $M_5$ 11 | $M_6$ 00 | $M_7$ 00 | $M_8$ 10 | $M_9$ 00 | $M_a$ 00 |

∗4

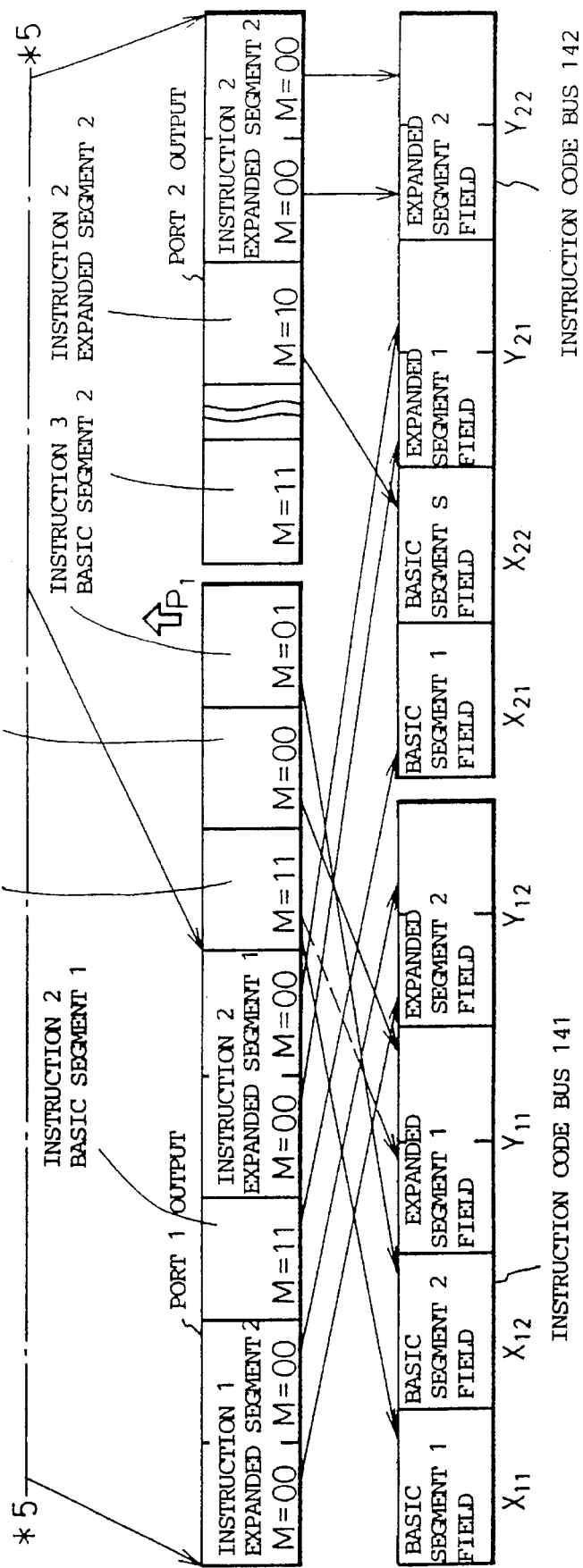

Fig. 10A

EXAMPLE OF INSTRUCTION CODE STRING

INSTRUCTION 1
IMMEDIATE (64 BIT)
→ MEMORY (DISPLACEMENT, NO)

| BASIC SEGMENT 1 | M₁ | EXPANDED SEGMENT 1 (1) | M₂ | EXPANDED SEGMENT 1 (2) | M₃ | EXPANDED SEGMENT 1 (3) | M₄ | EXPANDED SEGMENT 1 (4) | M₅ | BASIC SEGMENT 2 |
|---|---|---|---|---|---|---|---|---|---|---|
| M₀ 11 | 00 | | 01 | | 00 | | 00 | | 01 | |

INSTRUCTION 2
REGISTER
→ MEMORY (64 BIT, DISPLACEMENT)

| BASIC SEGMENT 1 | M₇ | BASIC SEGMENT 2 | M₈ | EXPANDED SEGMENT 2 (1) | M₉ | EXPANDED SEGMENT 2 (2) | Mₐ | EXPANDED SEGMENT 2 (3) | M_b | EXPANDED SEGMENT 2 (4) |
|---|---|---|---|---|---|---|---|---|---|---|
| M₆ 11 | 01 | | 00 | | 00 | | 00 | | 00 | |

*6 ——————— *6

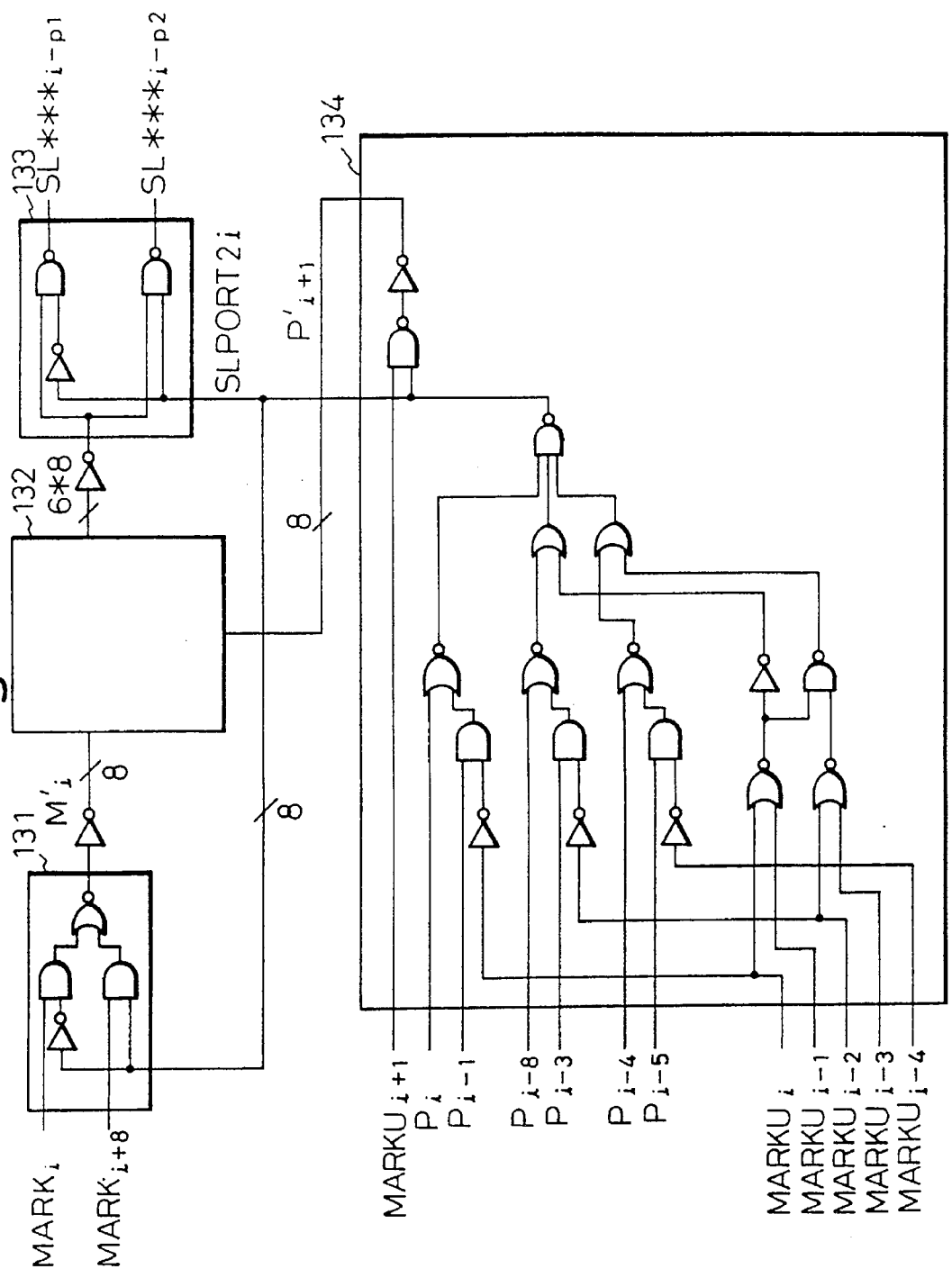

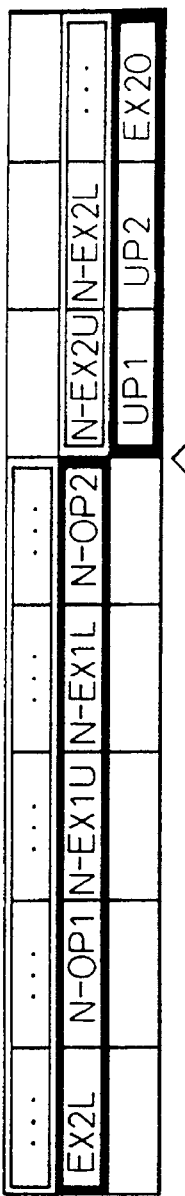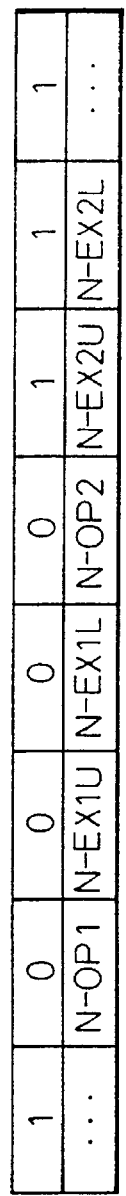
Fig.14A
Fig.14B

INSTRUCTION BUFFER DEVICE FOR PROCESSING AN INSTRUCTION SET OF VARIABLE-LENGTH INSTRUCTION CODES

FIELD OF THE INVENTION

The present invention relates to an instruction decoder and an instruction buffer device in a data processing system. More particularly, the invention relates to a data processing system for processing an instruction set of variable-length instruction code format.

BACKGROUND ART

An instruction set of variable-length instruction code format has a basic segment containing a code identifying type of instructions, and an expanded segment based on the identification in the basic segment. One instruction includes one or more basic segments. The expanded segment's attribute's, such as its presence or absence, length and so forth, are defined by the code in the effective address field contained in the basic segment. The effective address field is inserted immediately after the basic segment by which it is identified. In other words, the basic segment is a portion to be decoded by a decoder, such as a PLA, for the discrimination of instructions. The expanded segment is a data portion generating a displacement value or an immediate value.

FIG. 3(a) is an illustration showing one example of a typical instruction format used in the prior art. This instruction format is frequently established for binary operation. Therefore, discussion will give provided for the binary operation. Basic segments 1 300 and basic segment 2 310 form two basic segments respectively having one unit length (e.g. 2 bytes). Respective basic segments 300 and 310 have effective address fields EA1 504 and EA2 514 respectively identifying source operand and destination operand. Types of instructions are identified by other fields OP1 302 and OP2 312.

The effective address fields 304 and 314 contain encoded information indicating if the operand is a registered, immediate value or data in the memory. When the operand is data in the memory, it also identifies the address calculation method therefor. There are several address calculation methods, for example an absolute address mode identifying an address per se in the expanded segment; a register relative address mode or PC relative address mode adding value of a register or a program counter (PC) to the value of the expanded segment; a SP relative increment mode, in which address calculation and updating of the stack pointer; is performed employing a stack pointer and so forth. It should be noted that the basic segment is provided with a predetermined fixed length per instruction code (the length is variable in different instruction codes).

On the other hand, when the expanded segment is the immediate value, the length is determined according to the operand size. The operand size is assigned as 1 byte, two bytes (half word), four bytes (word) or eight bytes (long word) and so forth. In the case of a one byte immediate value, if the unit length of the instruction code is two bytes, the length becomes insufficient for filling the instruction code. In such a case, extra data (such "O") is added to the upper bite for adapting to the unit length. In the case of memory address identification, the expanded segment is regarded as a displacement value and is used for deriving the address by summing with zero, a register or the PC. In this case, the length of the expanded segment is identified by the effective address field to identify a sixteen bit displacement value, a thirty-two bit displacement value or a sixty-four bit displacement value and so forth. In the case of a SP relative address identification or a register indirect address identification, in which the displacement value is not added, the expanded segment will not be provided. The expanded portion is added immediately after the effective address is filed that identifies the same.

In FIGS. 3(B)-1 through 3(B)- 6, there is illustrated an example of the instruction code string formed with the basic segment and the expanded segment.

In the above-mentioned example, the register is basically formed by the basic segment. The length of the expanded segment arranged following a respective basic segment is illustrated to have the variable length of n times of the unit length L.

Next, an example of the conventional method for performing data processing employing such instruction code string is discussed with reference to FIGS. 4 and 5.

Namely, FIG. 5 shows a register containing the instruction format of immediate value (32 bits). The structure 500 contains the basic segment 1 501 and the expanded segment 1 502 and the basic segment 2 510 that does not have the expanded segment.

As shown in FIG. 4, the instruction code string obtained from an external memory or a cache 1 401 in advance of execution of the instructions, is stored in a data storage portion 3 403 of an instruction buffer 2 402. The storage section 3 403 is formed with a register file or so forth. One entry 4 404 has about a sixteen byte in the case of a sixty-four bits processor and about eight bytes in the case of a thirty-two bits processor. The instruction code string is stored in a plurality of entries 404, 404', 404"... according to the arrangement of sixteen bytes boundary or eight bytes boundary. The example in FIG. 4 shows an example of the thirty-two bits processor, and thus, the expanded segment having a sixth-four bits length will not be assigned.

The instruction buffer 2 402 is provided with a reading out pointer 7 407 indicative of the leading end of the instruction string to be supplied to an instruction decoder. The pointer 7 407 indicates an entry 404 containing the leading position P1 and the position in the entry using, for example, the program counter. Because of variable length instruction, the leading end of the instruction does not always indicate the 8 byte boundary or sixteen byte boundary. When the leading end is placed at the intermediate position P1, reading out is performed over two entries 404 and 404' (515 in FIG. 5). Therefore, the instruction buffer 2 performs a decoding of the entry 404 by reading per instruction code unit length.

FIG. 5 shows the reading out process.

The code read out takes the structure in a format of a reading out report output. If the code is directly output to the instruction code bus, it makes it difficult to identify the position on the bus to be picked up by the PLA for instruction decoding. Therefore, the code is rotated to place the leading end of the instruction code at the most significant position on the bus and then output 520.

In this case, the position of the second basic segment 2 510 is shifted away because of the presence of the expanded segment for the first effective address, when one instruction is formed with a plurality of basic segments 1 501 and 2 510. Accordingly, although it is easy to decode the first and second segments simultaneously when the first effective address has no expanded segment, if the first effective address has the expanded segment 502, the length of the expanded segment 2 (not shown) cannot be determined until decoded. Therefore, the second basic segment 510 cannot be input to the PLA in order to decode during the same cycle. This requires decoding to be performed separately in several cycles. This implies that, when the source operand is register direct and the destination operand is a memory, they can be decoded in one cycle, whereas even when the instruction code string is the same length, if the source operand is memory data or an the immediate value and the destination operand is the register, it requires two cycles for decoding An operation between the register and the memory can be decoded at one cycle, if the expanded segment identified by the second basic segment and the expanded segment in which the first basic segment identifies the memory differentiate the relative position from the leading end. However, the hardware required in the immediate and displacement generation circuit is increased.

The present invention is designed to improve the foregoing problems and has an object to provide a buffer means that enables simultaneous decoding even when one instruction is identified by a combination of a plurality of basic segments of instruction codes and a random length of the expanded segment is inserted between the basic segments. Another object of the invention is to minimize an increase in hardware in such a case.

DISCLOSURE OF THE INVENTION

In order to accomplish the above-mentioned objects, the present invention employs the following technical construction.

Namely, an instruction buffer device for processing an instruction code string that includes a basic segment including a code for distinguishing the type of instructions and expended segment depending upon the designation of the basic segment; the basic segment and the expanded segment respective having lengths of predetermined unit length; the length of the expanded segment being variable, and one or more of the basic segments and the expended segments being combined to form one instruction; the instruction buffer device comprises an instruction buffer including a marking providing device for discriminating each unit length of the instruction code string between the basic segment and non basic segment and providing a predetermined marking indicative thereof, code storage unit for reading and storing at least the instruction code string, marking storage unit for storing the marking, and an output selection circuit responsive to information from the marking storage means for selecting a predetermined instruction code string from the code storage means for outputting, instruction decoder, and a bus for connecting the instruction buffer and the instruction decoder; the bus being divided into a plurality of mutually distinct fields; the instruction buffer further identifying the leading position of the instruction code string to be output to the instruction decoder and control circuit that controls the coupling of one or more codes in the portions in the code string beginning at the leading position, and indicated as the basic segments by the marking, in a length not exceeding a predetermined length for outputting to one of the fields of the bus, and to output the portion of the code string beginning from the leading position, and indicated as a non basic segment by marking the other field of the bus.

Furthermore, in the present invention, with the instruction buffer device with the above-mentioned basic construction, the instruction buffer having a plurality of decoders for processing a plurality of instruction code strings having variable lengths of expanded segments simultaneously, can be formed. The expanded segment detects the least significant bit by detecting the immediately following basic segment so that it can be output to place the least significant bit on the corresponding field in the bus.

When it is desired to suppress an increase of the hardware by reducing the width of the bus, provided an instruction buffer can be used that restricts the number of expanded segments to be processed at one time and enables determination of the expanded segment field to output the expanded segment depending upon the order of the basic segment having the relevant expanded segment. Furthermore, in case of the system having a plurality of decoders and an instruction executing section, the marking is configured with a plurality of bits so as to determine whether the basic segment can be processed with the preceding basic segment by the same decoder as the marking. With this, the control circuit of the instruction buffer performs a re-arrangement of the basic segments and the expanded segments of the instruction code string bounded by the basic segments that cannot be decoded by the same decoder.

BRIEF DESCRIPTION OF THE DRAWINGS

FIG. 1 is an explanatory illustration relating to data processing in an instruction buffer according to the present invention;

FIGS. 2(*a*), 2(*b*), 2(*d*) and 2(*e*) are illustrations showing an; example of a re-arrangement of an instruction code string according to the present invention;

FIG. 3A is an illustration showing a structure of unit length of an instruction code according to the present invention;

FIGS. 3(B) -1 through 3(B) -6 are block diagram showing a practical examples of an instruction code string employed in the present invention;

FIG. 4 is a block diagram showing an example of a conventional instruction buffer device;

FIG. 5 is an illustration showing a manner of reading out an instruction code string employing a conventional instruction buffer device;

FIG. 6A is a partial block diagram showing a portion of an embodiment of the instruction buffer device according to the present invention;

FIG. 7B is a continuation of FIG. 7A showing re-arrangement of an instruction code string in the present invention;

FIG. 9A is a partial illustration showing an example of processing two instructions simultaneously employing the device of FIGS. 8A–8C;

FIG. 9C is a continuation of FIG. 9B showing an example of processing two instructions simultaneously employing the device of FIGS. 8A–C;

FIG. 10A is illustration showing another example of processing two instructions simultaneously employing the device of FIG. 8;

FIG. 13 is a block diagram showing one practical embodiment of the output position identification circuit for the second instruction code bus in the case that two instructions are processed simultaneously in the instruction buffer device according to the invention; and FIG. 14A and 14B are illustrations showing a manner of selection of first and second ports in simultaneous processing of two instructions in the instruction buffer device according to the present invention.

BEST MODE FOR IMPLEMENTING THE INVENTION

Figure 4:
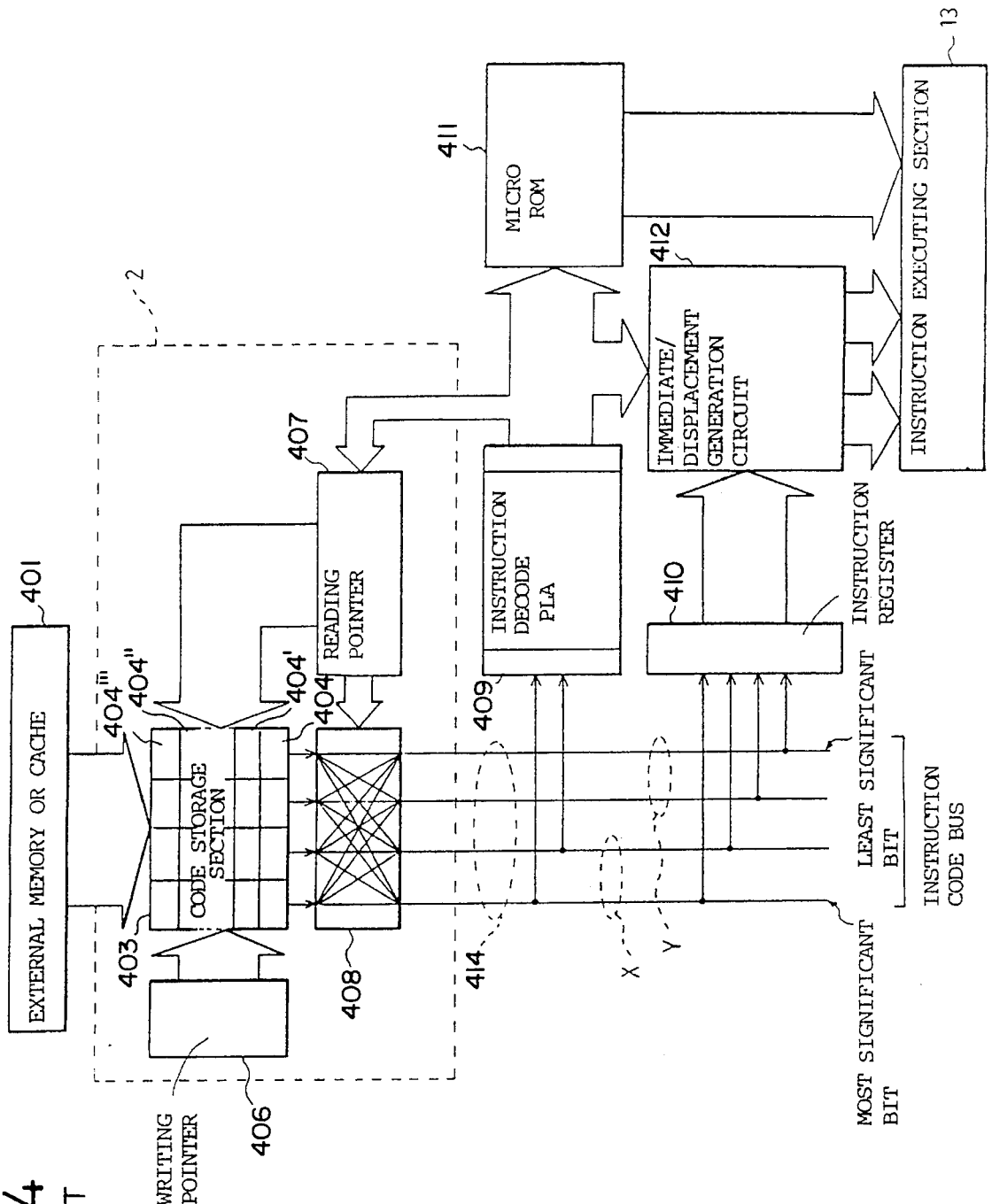

The embodiments of an instruction buffer device according to the present invention will be discussed in detail herebelow with reference to the drawings.

FIG. 1 is an illustration showing the principal of data processing in an instruction buffer device according to the present invention.

FIG. 2 is an example showing a re-arrangement of an instruction code sequence in the present invention.

In the maximum size structure, the width of the bus is determined by taking into account the case that first and second basic codes respectively have the maximum length of expanded segments. When the instruction code unit length is two bites and the maximum length of the expanded segments are respectively four bites (thirty-two bit processor), the width of the bus becomes twelve bites, and when the maximum length of the expanded segment is eight bites (sixty-four bit processor), the width of the bus becomes twenty bites. However, since it is difficult to control unless the entry of the cache or instruction buffer is nth power of 2, the entry of the instruction buffer is formed in a length of sixteen bites or thirty-two bites.

On the other hand, in the present invention, marking portions M (M1 to M3) are provided for respective unit lengths so that information indicative of the content of respective unit lengths is written therein.

In the present invention, as shown in FIG. 1, the above-mentioned instruction code string is output by distributing the instruction codes of the basic segments 1 and 2 to the basic segment fields X1 and X2, and the instruction codes in the expanded segments 1 and 2 to the expanded segment fields Y1 and Y2, by preliminarily separating the bus into the basic segment fields X (X1 and X2) and the expanded segment fields Y (Y1 and Y2).

Thereafter, as shown in FIG. 1, the converted instruction code string is transferred to the instruction register 10 and then processed by an immediate generation circuit or a displacement generation circuit by an instruction decoder 9.

Although FIG. 1 shows the construction in which two basic segments and a maximum two unit length of two expanded segments are output parallel, the arrangement of the expanded segments is variable depending upon the number of the unit length.

FIG. 2 shows some examples of the arrangements of the expanded segments.

As shown in FIG. 2, the basic segment is connected to the upper side X of the bus and the expanded section outputs to the corresponding expanded segment field Y. Two unit length of the expanded segments is output to the respective field as they are (FIG. 2(b)), and one unit length of the expanded segment is output to lower side one unit length of the respective field. In the later case, the upper side becomes null (FIG. 2(a)).

Since the basic segments are output to the fixed position on the bus even when the expanded segment is present therebetween, the instruction decoder can perform decoding by combining both basic segments in one cycle.

On the other hand, in the read out control of the instruction buffer, the unit length code pointed by a read out pointer is output to the first basic segment field of the bus, and the next unit length associated with the control mark indicative of the basic segment is output to the second basic segment field. The portion between the above-mentioned two unit lengths is output to the first expanded segment field, if any, and the position defined between the second basic segment and the next basic segment mark is output to the second expanded segment field by aligning with the least significant bit (FIGS. 2(c), (d), (e)).

In the present invention, before transferring the read out data from the instruction buffer 2 to the instruction decoder 9, the instruction bus is preliminarily divided into the fields for the basic segments and the fields for the expanded segments. The input instruction code string is output in such a manner that the instruction codes in the two basic segments 1 and 2 are output to the fields for the basic segments in adjacent positions to each other and the instruction codes in the expanded segments 1 and 2 respectively arranged corresponding to the basic segments are output, per each maximum two unit length, to the fields for the expanded segments.

Accordingly, even when the expanded segment is present between a plurality of the basic segments 1 and 2, and since the basic segments are output to the fixed positions, the instruction decoder can perform decoding by combining both at one cycle.

According to the present invention, the binary operation instruction that most frequently occurs among instruction sets can be simultaneously decoded with one instruction decoder irrespective of the presence and absence of the expanded segments.

Hereafter, the hardware construction for realizing the above-mentioned principal according to the present invention will be discussed with reference to FIG. 6.

Figure 6B:
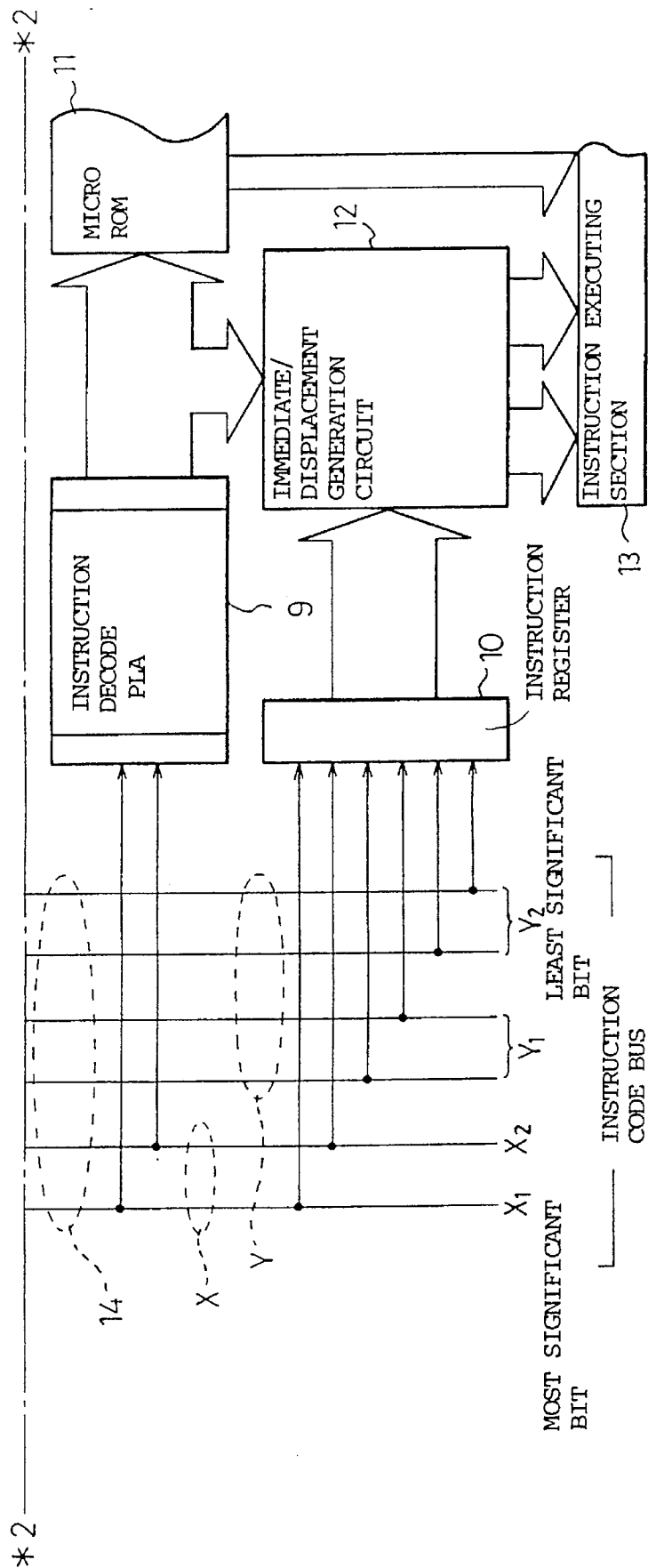
FIG. 6B is a continuation of FIG. 6A showing a portion of an embodiment of the instruction buffer device according to the present invention.

FIG. 6 is a block diagram showing one embodiment of the instruction buffer device according to the present invention. The instruction buffer device is designed for processing the instruction code string C that includes the above-mentioned basic segments containing the code distinguishing the type of instruction and the expanded segments added according to identification in the basic segments respective of the basic segments and the expanded segments have length of a multiple of the predetermined unit length; the length of the expanded section is individually variable, and one instruction is formed by combining one or more basic segments and the expended segments. The instruction buffer device includes a marking adding device 15, which comprises a pre-decoder so forth, for example, for effecting the predetermined marking for discriminating whether the unit length is for a basic segment or not for every unit length of the instruction code string, an instruction buffer 2 that includes at least a code storage device 3 for reading and storing the instruction code string C, a marking storage device 16 for storing the marking, and an output selection circuit 8 responsive to information from the marking storage means to select the predetermined instruction code string C from the code storage means for outputting, an instruction decoder 9, and a bus 14 connecting the instruction decoder 9 and the instruction buffer 2. The instruction buffer means 2 includes a leading position identifying device 7 for identifying the leading position of the instruction code strip to be output to the instruction decoder 9, and a control circuit 20 for coupling one or more codes in the portion, for which the markings indicate the basic segments among the code string from the leading position for a length not exceeding a predetermined length, outputting the coupled codes to one of the fields of the bus, and outputting the portions, for which the markings do not indicate the basic segment in the code string from the leading position to the other field in the bus.

The control circuit 20 in the present invention comprises an output position identification device 17 connected to the leading position identification device 4 that comprises the marking storage device 16 and the reading out pointer, and an output selection circuit.

It should be noted that the instruction code string output to the bus is input to the immediate/displacement generation circuit 12. The immediate displacement generation circuit 12 then performs a predetermined operation according to a command from the instruction decoder to output to the instruction executing section 13. It should be noted that the reference numeral 11 denotes a micro instruction control means, such as ROM or so forth.

Next, the manner of executing the data processing employing the above-mentioned device according to the present invention will be discussed with reference to FIG. 7.

The instruction code bus 14 has a six unit length (here, one unit length is assumed as two bites) in width, in which the first and second basic segment fields respectively have one unit length and the first and second expanded segment fields respectively have two unit lengths. The data storage section 3 of the instruction buffer has a plurality of entries (4, 4', 4". . . ), each having an eight unit length.

Whether the eight unit lengths are output from the external memory or cache at one time, or, as an alternative, separated into respective four unit lengths to be output at two separate timings. The pre-decoder 15 decodes the code string sequentially until a jump occurs in response to jumping destination instructions and add control marking M "10" for the basic segment that is not to be decoded simultaneously with the one preceding a basic segment "01" for the basic segments that are to be decoded simultaneously with the one preceding basic segment, and "00 for the expanded segments to store in the marking storage section 16 corresponding to the code storage section of the instruction buffer. Each two bits of the control marking M are provided by the decoder for simplicity of updating. When the instruction code that cannot be decoded simultaneously is present at the position of the second basic segment, the decoder simply ignores it. However, for updating the pointer, it is necessary to discriminate whether the second basic segment and the expanded segments are to be simultaneously processed or not. If the discrimination is to be controlled by obtaining information from the instruction decoder, timing becomes difficult. Therefore, discrimination is made by the pre-decoder 15.

The read out pointer 7 identifies the leading end P1 of the instruction code string C to be read out from the instruction buffer 2. The lower three bits of a plurality of bits of a pointer are used for selecting the code of eight unit lengths of one entry 4, and other fields of the pointer are used for selecting one of the entries 4, 4', 4" . . . .

When the code storage section 4 is divided into fields 0 to 7 per every unit length, if the lower three bits of the pointer indicates the field n, the fields n to 7 are read out from the first entry 4 indicated by the upper bits of the pointer, the fields 0 to (n–1) are read out from the entry 4' next to the entry 4 indicated by the upper bits of the pointer. When the upper bits of the pointer shows the last entry 4", the next entry is lapped around to indicate the first entry.

Figure 7A:
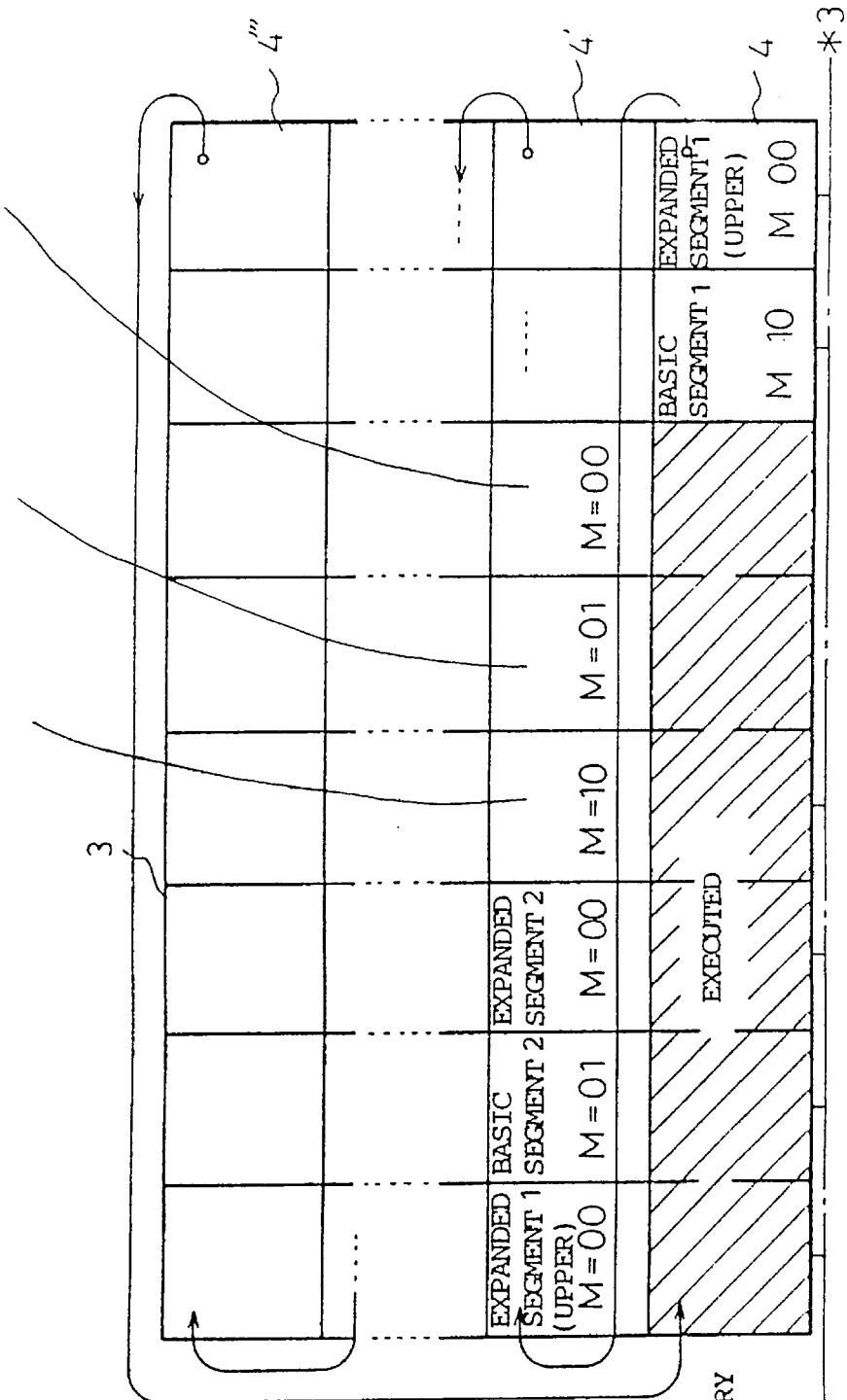
FIG. 7A is a partial illustration showing the re-arrangement of an instruction code string in the present invention.

FIG. 7B shows the result read out from the storage section in the first line.

In the prior art, the result is rotated so that the code indicated by the lower three bits of the pointer is placed at the leading end and the length is adjusted into the length of the width of the bus, to be output to the bus as in the second line.

In the present invention, the basic section and the expanded section are distinguished depending upon the contents of the marking section M read out simultaneously with the code section and which is re-arranged in the third line and adapted to the basic segment 1 field X1, the basic segment 2 field X2, the expanded segment 1 field Y1 and the expanded segment 2 filed Y2 of the bus. In the practical circuit, instead of re-arranging from the first to the third line, the re-arrangement is performed directly from (b) to (d) neglecting (c).

Control of the re-arrangement is performed by the control circuit, which includes the output position identification circuit of FIG. 6. As a principal, the basic segment of the field, to which the pointer is pointed, becomes the basic segment 1 field. The basic segment 2 fields the field that follows the filed pointed by the pointer and is the first field having the control marking other than "00". The code string that has a 2 unit length at most and positioned before the second basic segment is output to the expanded segment 1 field. When the two unit length of the code string contains a segment other than the expanded segment, it is ignored during immediate and displacement generation.

The maximum two unit length of code string that immediately precedes the third basic segment position from the leading end is output to the expanded segment 2 field. The code length from the first basic segment to the second basic segment when the control marking M of the second basic segment is "10", and the code length from the first basic segment to the position immediately before the third basic segment when the control marking M of the second basic segment is "01" is added to the pointer after reading out.

In the content output from the instruction buffer 2 to the bus 14, the first and second basic segment fields X1 and X2 are input to the PLA for the instruction decoder 9. Also, all fields are obtained in the instruction register 10. The expanded segment fields Y are used for immediate and displacement generation. The basic segment fields in the instruction register are used for the derivation of the available register number for address calculation or the operand and for withdrawal of the immediate and display buried in the basic segment by the specific format of instructions.

Typically, in the immediate and displacement generation, the identification of the immediate or displacement and the identification of the size (one bite, two bites or four bites) from the decoder with respect to the first and second expanded segment fields are required. In the case that the immediate and displacement generation is able to generate simultaneously one immediate and one displacement, the instructions to generate two displacements (inter-memory operation) and two immediates (special instruction), are divided by the control marking "10" by the pre-decoder.

In the present invention, in the case of a variable length instruction, since the path for outputting the code read out from the storage section of the instruction buffer to the desired position on the bus with the unit length has been known in the art, there is no increase of the hardware except for the circuit designating the output position.

To the first and second basic segment fields, the PLA circuit and so forth is connected. On the other hand, the first and second expanded segment fields are connected to the immediate and displacement generation section via the instruction register. Since the immediate cannot be designated as destination, and the frequency of occurrence of assigning the immediate as the second operand in the specific instructions, the second immediate generation circuit can be neglected.

The expanded segment is aligned to the least significant bit using the output position selection circuit in the instruction buffer. Therefore, depending upon the size of the expanded segment, the upper bits can be simply ignored. Therefore, the hardware of the immediate and the displacement generating section can be made smaller.

When both the source and destination are identification of the memory, in order to process decoding simultaneously with the single decoder, duplicate paths for an address calculation section including the displacement generation section are required. Since this involves greater cost for the duplication of the address and the data bus or for providing two ports for the cache memory, simultaneous decoding with the single decoder is typically not performed.

Accordingly, when a binary operation instruction is decoded at one time, a plurality of expanded segments are present only in the case of an immediate-memory operation. When this operation has a much lesser frequency of occurrence in comparison with the memory-memory operation and it is determined that it is undesirable to expand the width of the output bus only for this operation in view of the performance-cost balance, the fields on the bus for the expanded segment can be reduced.

In such a case, though the outputs of the first and second basic segments to the bus are unchanged, the field on the bus for outputting the expanded segment becomes one, the expanded segment appearing first from the leading end of the instruction is selected to be output to the field.

According to the present invention, since pre-decoding becomes necessary at a certain timing until the code is output from the instruction buffer, the present invention is most effective for a system, in which a plurality of instructions are executed simultaneously.

In such a system, when instructions are supplied from the instruction buffer to a plurality of instruction decoders, it is not possible to transfer the instruction code to the second and succeeding instruction decoders unless a position of the boundary for dividing the instruction code string is fed to a respective decoder. Therefore, the instruction pre-decoder becomes essential. A minimum increase of hardware us required in the implementation of the present invention by employing the pre-decoder.

In this case, the control marking is expanded so that it may distinguish not only between the basic segment and other segments in the instruction code, but also whether the instruction code can be processed with the same decoder for the preceding basic segment. As set forth in the arrangement in which two basic segments are simultaneously processed with the single decoder, the control marking serves to distinguish whether the second instruction code next to the leading instruction code is to be fed to the same decoder, to which the one preceding basic segment is fed or to be set as the leading code for the next instruction decoder.

Figure 8C:
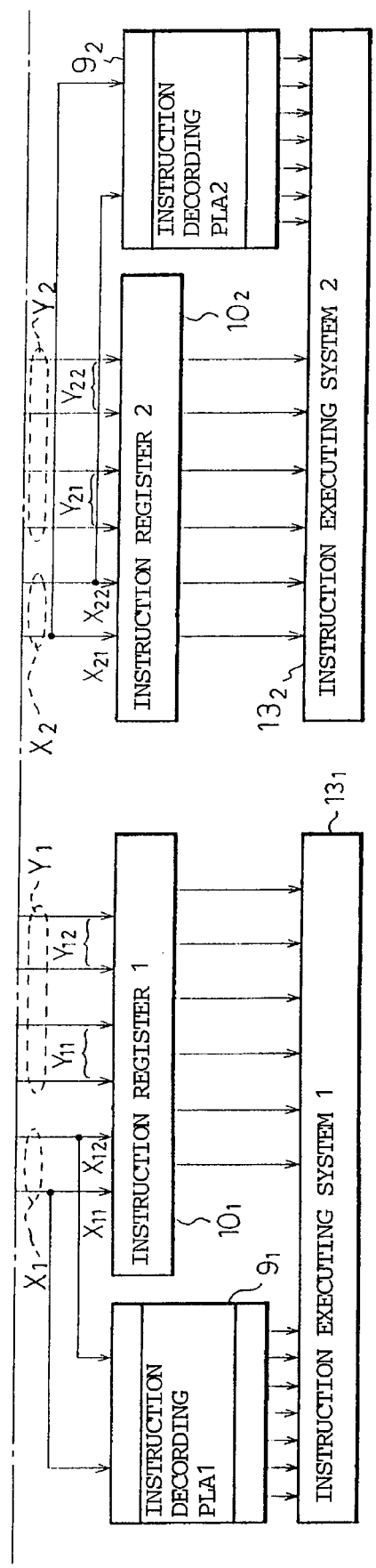
FIG. 8A is a partial illustration showing an embodiment of the instruction buffer device suitable for processing two instructions simultaneously, according to the present invention.
FIG. 8B is a continuation of FIG. 8A showing an embodiment of the instruction buffer device suitable for processing two instructions simultaneously, according to the present invention.

Next, in the present invention, an example of processing two instruction code strings having variable expanded segments will be discussed with reference to FIGS. 8 to 10.

FIG. 8 is an illustration showing a system for implementing the above-mentioned process according to the present invention.

The basic construction is the same as that illustration in FIG. 6. However, the shown system is differentiated in that respective two output section means and the instruction registers are provided.

In the shown embodiment, a path for fetching the instruction code before obtaining the instruction buffer has no constraint. However, a system capable of performing pre-decoding upon reading in the instruction cache and storing with the control marking M in the instruction cache, can be considered. This system provides the advantage that the pre-decoding period is unnecessary upon a cache hit, since the pre-decoding will take time.

The control marking M is required to have at least two bits per unit code length for control in the instruction buffer 2. For example, the definition of the control marking M is given such that "00" represents other than the basic segment, "01" represents a segment the basic segment that can be decoded simultaneously with the one preceding basic segment, "10" represents the basic segment that is the basic segment of the same instruction to the one preceding basic segment but cannot be decoded simultaneously with the one preceding basic segment, and "11" represents the basic segment in an instruction different than the instruction preceding the basic segment.

For simultaneously decoding two instructions as in the shown embodiment, two instruction code buses 14$_1$ and 14$_2$ are independently connected to respective decoders 9$_1$ and 9$_2$ from the instruction buffer 2. Therefore, two output selection circuits 8 also become necessary for re-arranging the content of the code storage section for outputting to the buses.

When two decoders are provided, the maximum length of the instruction code to be processed in one cycle is twice that of the case in which a single decoder is provided. In order to expand the width for reading out from the code storage section 3, the present invention contrives to increase the number of reading out ports, instead of expanding the width of one entry. In the shown case, two ports are provided. The first port is adapted to read out an eight unit length from the position P$_1$ where it is indicated by the reading out pointer, and the second port is adapted to read out an eight unit length from the position that is defined by adding eight to the reading out pointer, because the expansion of the length of one entry may require increasing the hardware in the output selection circuit.

The output selection circuits 8₁ and 8₂ do not have the same constriction. Since the code string (here, six unit length at most) to be fed to the first decoder 9₁ is selected within the six unit length from the position P₁ indicated pointed by the reading out pointer, it can be selected from the output through the first reading out port. However, since the code string to be fed to the second decoder 9₂ remains a six unit length and removes the portion to be processed by the first decoder, it is present in the first reading out port or over the first and second reading out ports. Therefore, the output selection circuit 8₂ must select the output to the bus from all outputs through both ports.

Discussion will be provided for control of the selection of the output position to the instruction code buses 14₁ and 14₂ by taking an example as illustrated in FIG. 9.

The instruction in the shown example is assumed to have the instruction 1 for immediate-memory operation shown in FIG. 9(a) and the instruction 2 for memory-memory operation, in which the basic segments are respectively sixteen bits, the expanded segments respectively have thirty-two bits at maximum, and the instruction code buses 1 and 2 respectively have two expansion segment fields.

Figure 9B:
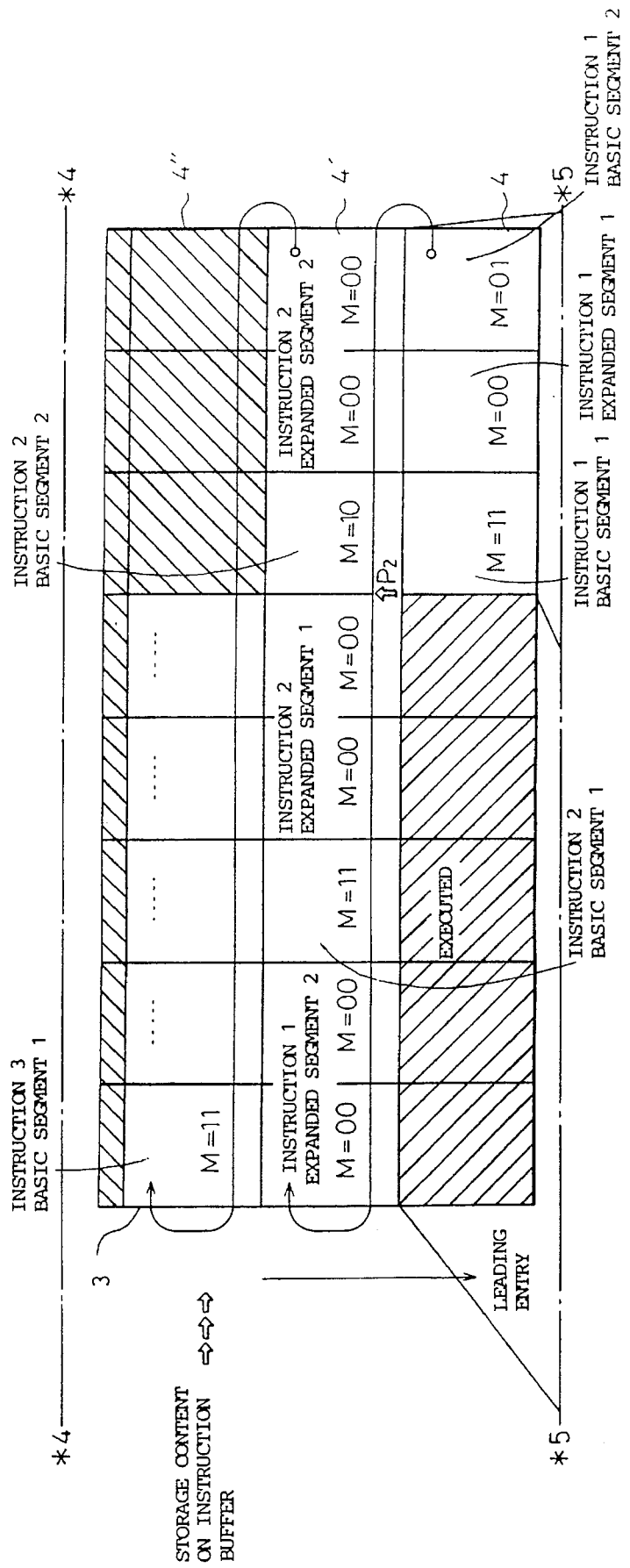
FIG. 9B is a continuation of FIG. 9A showing an example of processing two instructions simultaneously employing the device of FIGS. 8A–C.
Figure 10B:
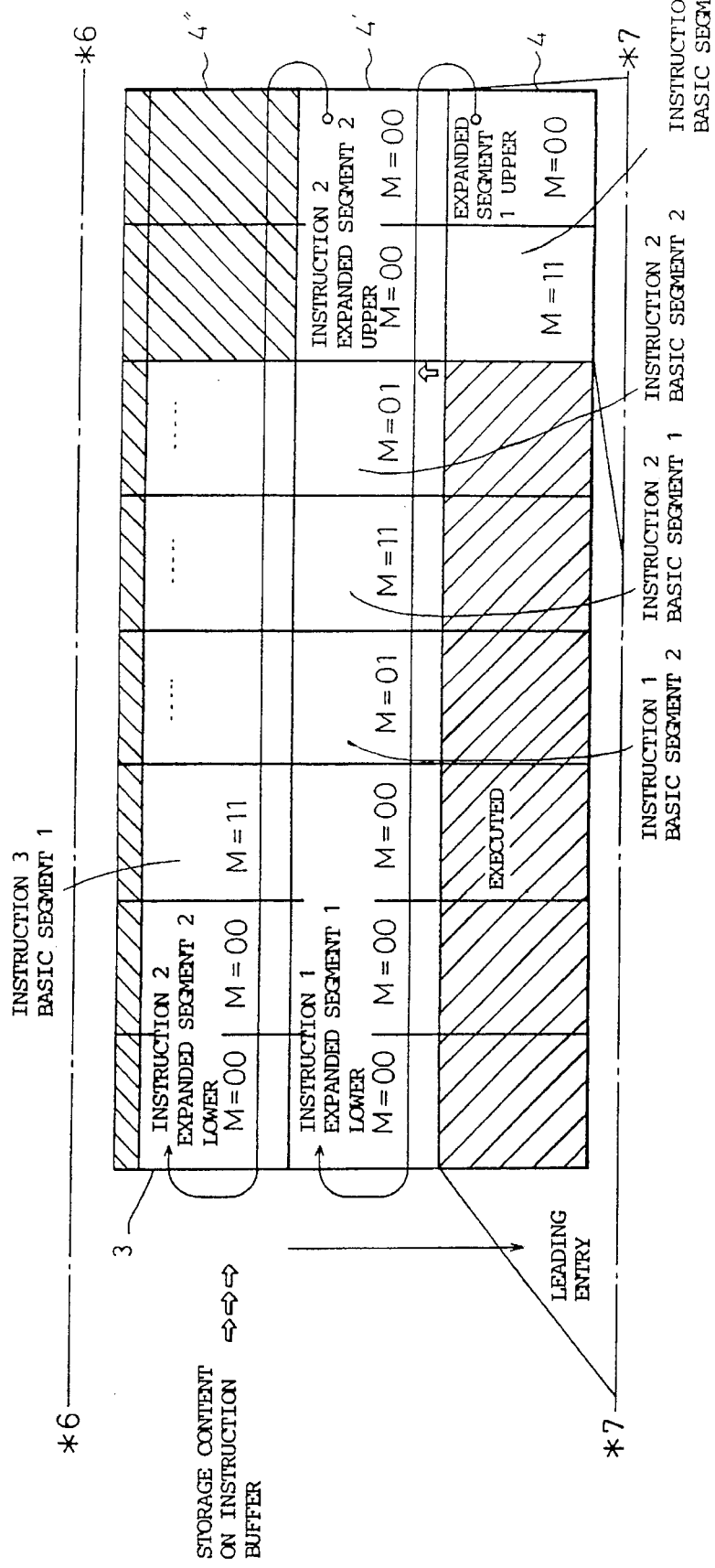
FIG. 10B is a continuation of FIG. 10A showing an example of processing two instructions simultaneously employing the device of FIGS. 8A–C.
Figure 10C:
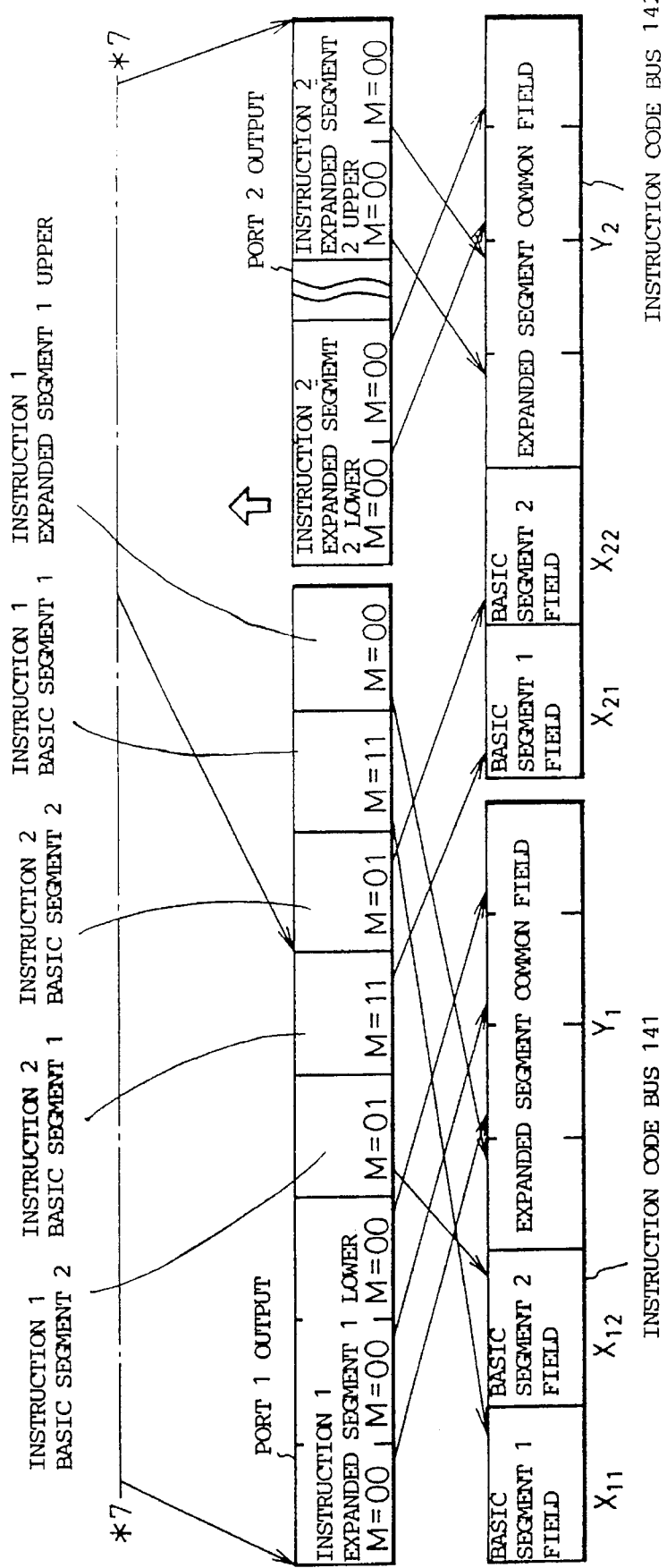
FIG. 10C is a continuation of FIG. 10B showing another example of processing two instructions simultaneously employing the device of FIGS. 8A–C.

As shown in FIG. 9(b), on the instruction buffer 2, the code strings are stored in each entry 4, 4', 4''. . . of the code storage means 3 according to the sixteen bits boundary, and the reading pointer indicates the field P₁ of sixth unit length.

Two ports are provided for reading out from the storage section 3 so that any length of two instructions can be read out at one time by combining the outputs from both ports. Here, the width of the bus is twenty-four bites in total for both ports, which is shorter than the thirty-two bites of code length to be read out from the storage section 3. Therefore, eight bites are constantly wasted. However, since the position of the wasted eight bites is variable depending upon the value of the reading out pointer, a reading out line cannot be neglected. The contents of the reading out pointers 1 and 2 are as illustrated in FIG. 9(c).

Since the read out code string is maintained at the field positions in the entry 4, the leading position is determined by the lower three bits of the pointer. The first basic segment output of the output selection circuit 8₁ becomes the code at the position P₁ pointed by this pointer. The next basic segment, namely the portion where the control marking is not "00" following the position pointed by the pointer (it is regarded that the first field of the first port is present following the eighth field), is output to the basic segment field X₁₂ of the instruction code bus 14₁. The maximum two unit length of code immediately preceding the second basic segment that is selected as set forth above is output to the expanded segment field Y₁₁ of the instruction code bus 14₁. Similarly the maximum two unit length of code immediately preceding the third basic segment, is output to the expanded segment field Y₁₂ of the instruction code bus 14₁, by seeking the third basic segment.

On the other hand, the basic segment that is positioned following the position P₁ indicated by the pointer and cannot be decoded simultaneously, i.e. the upper bit of the control marking being "1", is found and output to the basic segment 1 field X₂₁ of the instruction code bus 14₂.

The remaining fields are determined in a similar manner to the instruction code bus 14₁ with reference to the position determined as set forth above. Assuming that the lower three bits of the pointer is n ("5"in the show embodiment) the field n of the second port is Connected to the field (n−1) of the first port. It should be noted that the field numbers 0 to 7 are set for lapping around.

The instruction 2 as the content of the instruction code bus 14₂ cannot be processed at one time since there is only one address calculator or the operand access path in the memory-memory operation for one instruction execution system. This is ignored by the decoder. The read out indicated is updated per eight unit length so that the next read out is performed by taking the basic segment 2 of the instruction 2 as a leading end.

When the expanded segment field is provided in common to the first and second basic segment in another embodiment, if both basic segments have expanded segments and they are not processed at one time by the single decoder, the cost and hardware amount 9 can be reduced. Therefore, by slightly modifying the control of the output position identification circuit of FIG. 8, the sixty-four bit processing system can be realized with respect to the instruction buffer at the same cost. The practical example thereof will be discussed with reference to FIGS. 10a–10c.

In this case, the maximum code to be processed by the single decoder at one time is two basic segments and the expanded segment of one of those basic segments. If the operand identified by the basic segment 1 is the register direct, simultaneous processing is possible irrespective of the type of second basic segment (as long as it is not in different instructions). When the operand identified by the basic segment 1 is the immediate, the second basic segment 2 can be simultaneously processed unless it is an identification of the memory with the expanded segment or is an identification of the immediate. If the operand identified by the basic segment 1 is the memory, the basic segment 2 can be simultaneously processed only when the second basic segment is designated for the register direct.

The output position control for the instruction code bus is the same as the example of FIG. 9 with respect to the basic segments. With respect to the expanded segments, the first portion following the leading basic segment of the instruction code bus having the control marking "00" and up to immediately before the succeeding portion having the control marking "00" (or having the control marking with the upper bit "1") is output and aligned with the least significant bit.

The practical embodiment of the output position identification circuit 17 and the selection circuit 8 to be employed in the foregoing embodiment of the present invention will be discussed with reference to FIGS. 11 to 14.

Figure 11:
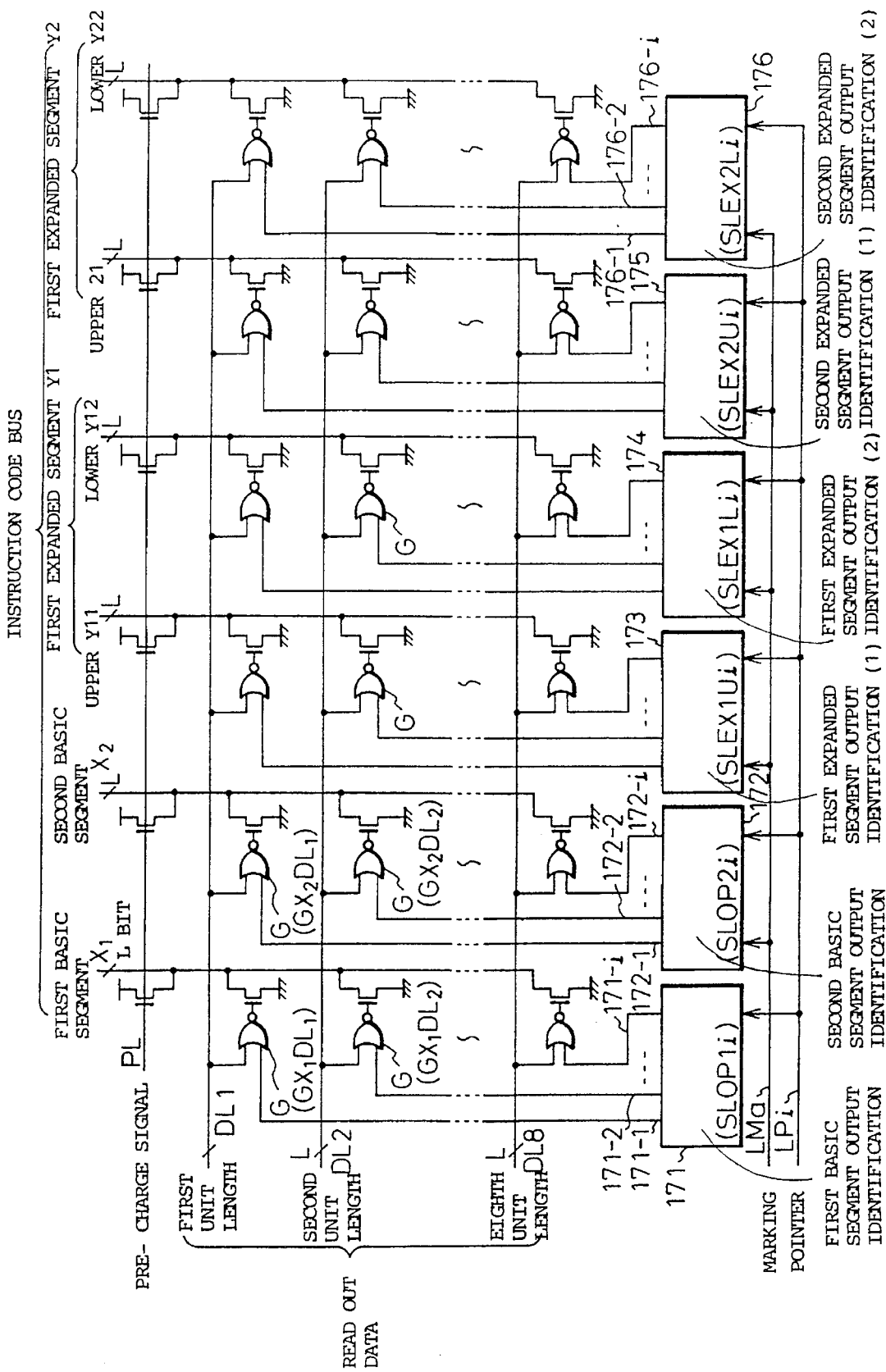
FIG. 11 is a block diagram showing one practical embodiment of an output position identification circuit 17 and a selection circuit 18 employed in the instruction buffer device according to the present invention.

FIG. 11 is a block diagram showing one practical embodiment of the output position identification circuit 17 and the selection circuit 8 to be employed in the instruction buffer device according to the present invention.

In FIG. 11, there are illustrated bit lines representative of respective bits of the instruction code bus. In practice, a respective line has a bit width of the unit length L.

Namely, there is provided a bit line X1 representative of the first basic segment, a bit line X2 representative of the second basic segment, a bit line Y11 representative of the upper side of the first expanded segment Y1, a bit line Y12 representative of the lower side of the first expanded segment Y1, a bit line Y21 representative of the upper side of the second expanded segment Y2, and a bit line Y22 representative of the lower side of the second expanded segment Y2. Also, data lines DL1 to DL8, to which the first unit length, the second unit length, . . . eighth unit length of the reading out data are input, are provided. For respective intersections, a $\overline{\text{NOR}}$ gate G and a N-channel type MOS transistors T having a gate connected to NOR gate G are provided. These form a circuit, in which the data on one of the data lines DL1 to DL8 are connected to one of the inputs of the NOR gate, and the N-channel type MOS transistor T is connected to one of the bit lines at one terminal and to the ground at the other terminal. With such circuits, a matrix circuit is established.

On the other hand, the output position identification circuit 17 comprises a first basic segment output position identification circuit 171, a second basic segment output position identification circuit 172, a first expanded position output identification circuit (1) 173, a first expanded position output identification circuit (2) 174, a second expanded position output identification circuit (1) 175, and a second expanded position output identification circuit (2) 176. Respective identification circuits are connected to a marking signal lines LMA and pointer signal lines LPi. Furthermore, from respective identification circuits 171 to 176, eight output lines 171-1 ... 171-8, 172-1 ... 172-8 for generating output signals corresponding to the position signal (i=0 to 7) of the pointer, are provided. Respective output lines are connected to the other inputs of the NOR gate G.

Namely, the output line 171-1 of the first basic segment output position identification circuit 171 is connected to the input terminal of the NOR gate circuit GX1DL1 connected to the first unit length signal line DL1. The output line 171-2 of the first basic segment output position identification circuit 171 is connected to the input terminal of the NOR gate GX1DL2 connected to the second unit line signal line DL2. The output line 172-1 of the second basic segment output position identification circuit 172 is connected to the input terminal of the NOR gate GX2DL1 connected to the first unit length signal line DL1. The output line 172-2 of the second basic segment output position identification circuit 172 is connected to the input terminal oil the NOR gate GX2DL2 connected to the second unit length signal line DL2.

Accordingly, in the output position identification circuit 17 of FIG. 11, the output line to the output position identification circuits 171 to 176 is determined by the information of the marking (MARKi) and the position information of the pointer.

Namely, when the output to the bit line X1 of the first basic segment is selected, it is selected only by the position Pi of the pointer. Assuming the position Pi of the pointer is 0, the first output line 171-1 of the first basic segment output position identification circuit 171 is selected so that the signal level of the corresponding output line becomes "L" level.

By this, the first unit length of code data of the read out data appears on the bit line X1 of the first basic segment via the first unit length signal line DL1.

Similarly, when the bit line X2 of the second basic segment is to be selected, as set out later, if the first output line 172-3 of the second basic segment output position identification circuit 172 is selected on the basis of the information of the Marking (MARKi) and the position information (Pi) of the pointer, the signal level of the corresponding output line becomes "L" level. Then, the third unit length of the code data of the read out data appears on the bit line X2 of the second basic segment via the third unit length signal line DL3.

The selection method for the output position in another instruction code bus is performed in a similar manner.

It should be appreciated that the foregoing embodiment shows an example of an arithmetic process with a negative logic. Also, a pre-charge circuit illustrated in the drawing is provided for preliminarily charging the bus to "H" in advance of a code output to the bus.

Figure 12:
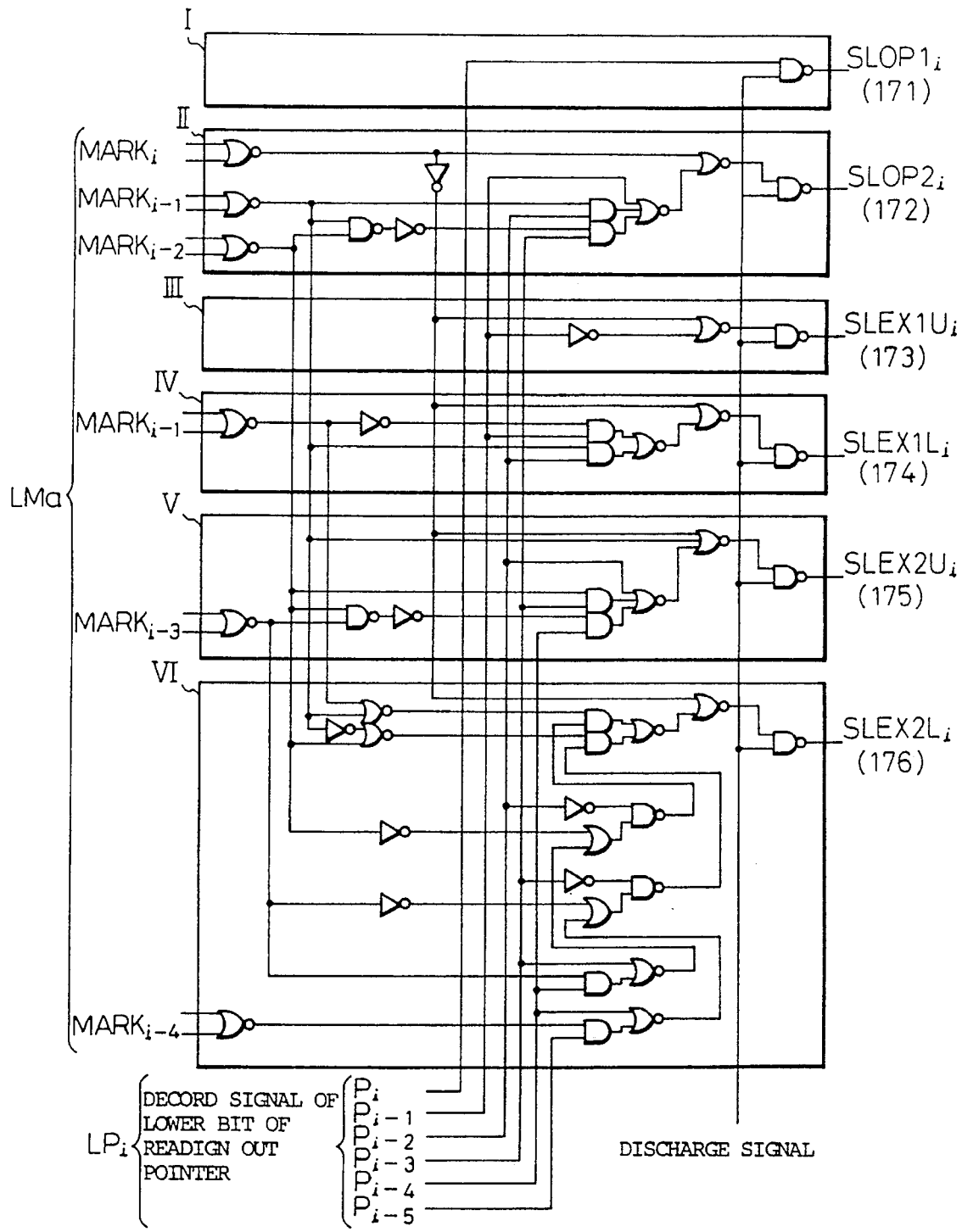
FIG. 12 is a block diagram showing a logical construction of the output position identification circuit 17 employed in the instruction buffer device according to the invention.

FIG. 12 shows the logical construction of the output position identification circuit 17 shown in FIG. 11, and shows the circuit construction for controlling outputting the ith unit length code of the read out means in FIG. 11 to a selected field.

The shown circuit is provided with selection circuit sections I to VI respectively corresponding to the output position identification circuits 171 to 176. For each selection circuit section, as shown in the drawing, a NAND gate circuit, a NOR gate circuit, and an invertor circuit are arranged to establish a predetermined logic.

It should be noted that, in FIG. 12, the signs of Pi to Pi-5 represent a decoded signal of the lower three bits Of the lead pointer, which correspond to the signal appearing on a pointer signal line LPi.

On the other hand, in FIG. 12, the input signals MARKi, MARKi-1, MARKi-2, MARKi-3, MARKi-4, MARKi+1 and so forth correspond to the signal appearing on the marking signal line LMA.

It should be noted that a discharge signal in FIG. 12 is a timing signal for enabling a bus driver at a timing not overlapping the pre-charge signal for the bus.

On the other hand, in the practical embodiment of the present invention, since the read out data has an eight unit length, the eight logic circuits shown in FIG. 12 is required for the cases wherein respective lead pointer positions i are 0 to 7.

The practical logic of the output position identification selection in the above-mentioned circuit construction will be discussed herebelow.

At first, the first selection circuit section I is adapted to select the first basic segment output position identification circuit (SLOP1i), and selection is determined solely based on the position i of the lead pointer.

Namely, with the logic and selection code as shown in the following table 1, the code indicated by the lower three bits of the lead pointer is selected.

TABLE 1

SLOP1i ← Pi

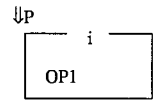

On the other hand, the second selection circuit section II is adapted to the second basic segment output position identification circuit (SLOP2i). The logic for selection is selected when the marking at the corresponding position is the base segment (MARKi ≠00) and the marking from the instruction code next to the pointer to the instruction code immediately before the corresponding i does not include the basic segment.

In this case, the selection logic and the code arrangement to be selected are as shown in the following table 2.

TABLE 2

SLOP2i ← Mi & (Pi−1!!Mi−1 & (Pi−2!(Pi−3) & !Mi−2)))

⇓P

|   |   |   | i−1 | i |
|---|---|---|-----|---|
|   |   | ⇓P i−2 | OP1 | OP2 |
|   | ⇓P | OP1 | EX1 | OP2 |
| ⇓P | i−3 | | | |
| | OP1 | EX1U | EX1L | OP2 |

Next, the third selection circuit section III is adapted to select an upper side of the output position identification circuit (SLEX1Ui) of the first expanded segment. The selection logic is to select the instruction code when the marking of the code next to the position indicated by the lead pointer is the expanded segment.

In this case, the selection logic and the core arrangement to be selected are as shown in the following table 3.

TABLE 3

SLEX1Ui ← !Mi & Pi−1

⇓P

|   | i−1 | i |
|---|-----|---|
|   | OP1 | EX1 |

On the other hand, the fourth selection circuit section IV is adapted to select the lower side output position identification circuit (SLEX1Li) of the first expanded segment. The selection logic is to be selected when it is at a position i two positions from the position indicated by the lead pointer and the code at the immediately preceding position (i−1) indicates the expanded segment [namely, the lower side of the expanded segment 1 having a unit length L×2], or it is positioned next to the position indicated by the lead pointer and the code at the immediately following position (i+1) shows the basic segment [namely, the expanded segment has a unit length L×1].

The selection logic and the code arrangement to be selected are as shown in the following table 4.

TABLE 4

SLEX1Li ← !Mi & ((Pi−1 & Mi−1)!(Pi−2 & !Mi−1))

⇓P

|   |   | i−1 | i | i+1 |
|---|---|-----|---|-----|
|   | ⇓P | OP1 | EX1 | OP2 |
|   | i−2 | | | |
|   | OP1 | EX1U | EX1L | |

Furthermore, the selection circuit section V selects the upper side output position identification circuit (SLEX2Ui) of the second expanded segment. The selection logic is to select when the position immediately preceding the position i is the first basic segment after the pointer.

The selection logic and the code arrangement to be selected are as shown in the following table 5.

TABLE 5

SLEX2Ui ← !Mi & Mi−1(Pi−2!(!Mi−2 & (Pi−3!(Pi−4 & !Mi−3))))

⇓P

|   |   |   | i−2 | i−1 | i |
|---|---|---|-----|-----|---|
|   |   | ⇓P | OP1 | OP2 | EX2 |
|   |   | i−3 | | | |
|   | ⇓P | OP1 | EX1 | OP2 | EX2 |
|   | i−4 | | | | |
|   | OP1 | EX1U | EX1U | OP2 | EX2 |

Finally, the sixth selection circuit section VI is adapted to select the lower bit (SLEX2Li) of the second expanded segment output position identification circuit. The selection logic is such that the immediately preceding position (i−1) of the position i is the first basic segment following the pointer, and the immediately following position (i+1) is the basic segment [namely, in the case of the expanded segment having a length of L×1], or two preceding positions (i−2) from the position i is the first basic segment from the pointer and the immediately preceding position is the expanded segment [namely, in the case of the lower side of the expanded segment having a length of L×2].

The selection logic and the code arrangement to be selected are as shown in the following table 5.

TABLE 5

SLEX2Li ← !Mi & (Mi−1 & Mi+1 & (Pi−2!(!Mi−2& (Pi−3!(Pi−4 & !Mi−3))))
Mi−2 & !Mi−1 & (Pi−3!(!Mi−3 & (Pi−4)!(Pi−5 & !Mi−4))))

| | | | | i−2 | i−1 | i | i+1 |
|---|---|---|---|---|---|---|---|
| | | | ⇓P | OP1 | OP2 | EX2 | OP |
| | | ⇓P | i−3 | | | | |
| | | | OP1 | EX1 | OP2 | EX2 | OP |
| | ⇓ | i−4 | | | | | |
| | | OP1 | EX1U | EX1L | OP2 | EX2 | OP |
| | ⇓P | | OP1 | OP2 | EX2U | EX2L | |
| | | i−4 | | | | | |
| ⇓P | | OP1 | EX1 | OP2 | EX2U | EX2L | |
| | i−5 | | | | | | |
| OP1 | EX1U | EX1L | OP2 | EX2U | EX2L | | |

It should be noted that, in the above-mentioned logic, "Mi" is a logic when the marking at the position i is a designation of the basic segment.

"!Mi" is the logical negative of "Mi".

"&" represents AND and "!" represents OR

On the other hand, FIG. 13 is a block diagram showing one practical embodiment of the output position identification circuit to the second instruction code bus in the case that a two instruction simultaneous processing is performed in the instruction buffer device according to the present invention.

The shown circuit is realized by inputting the pointer P' and the marking M', which are collected by eliminating the portion output to the first bus from the output of the two, first and second read out ports, to the same circuit as shown in FIG. 12. Namely, the P' is the pointer indicative of the leading position of the output to the second bus.

A block 131 in FIG. 13 comprises two AND gate circuits, NOR gate circuit and invertor and has a function to, switch the eight marking of the instruction code within the entry which is output from the first reading out, port and the eight marking of the instruction code in the entry, output from the second reading out port, on the basis of the signal (SLPORT2i) output from a later-mentioned block 134. On the other hand, a block 132 employs the same circuit as that illustrated in FIG. 12 and eight corresponding circuits are arranged.

A block 133 comprises an invertor and two AND gates. The block 133 is provided a function for selectively switching an output identification signal SL*i-p1 Selecting and outputting the code of the first reading out port and an output identification signal SL*i-p2 selecting and outputting the code of the second reading out port.

The block 134 is a circuit for discriminating whether the field i of the first reading out port is output to the instruction code bus or not. The circuit comprising an AND gate circuit, a NOR gate circuit, an invertor and a NAND gate circuit are arranged in a predetermined configuration.

The inputs for the block circuit 134 are a MARKUi signal as the upper bit of the marking MARKi and a current position Pi signal of the lead pointer. The MARKUi represents the boundary of the decoding process when MARKU1 is one after the position indicated by the lead pointer and thus indicates that the first output port is in use. Therefore, it can be understood that the subsequent instruction code must be output to the second output port.

On the other hand, when the MARKUi is O, the instruction code is output to the first output port.

In such a circuit, with respect to the ith data, a check is performed to determine whether MARKUi became 1 on or before the current status or not. Based on the results, the above-mentioned output signal (SLPORT2i) is output.

Accordingly, when the first output port is already used, the output signal SLPORT2i outputs 1 so that the output identification signal SL***i-p2 selecting the second output port is output in the block 133.

Conversely, when output signal SLPORT2i outputs 0, the output identification signal SL***i-p1 for selecting the first output port is output in the block 133.

In the output identification signal SL*i-p, * is six types of OP1, OP2, EX1U, EX1L, EX2U and EX2L in FIG. 12.

On the other hand, in the drawing, P' and M' represent the pointer indicative of the output leading end to the second bus and the marking corresponding to the subsequent position.

FIG. 14 illustrates an example for switching the outputs to the first and second ports of the instruction code in the above-mentioned circuit construction.

Namely, FIG. 14A shows the first to third entries E1 to E3. Among these, the instruction code OP1 at the position pointed by the pointer P in the first entry E1 is taken as a leading end for outputting OP2, EX2U and EX2L in the second entry E2 through the first bus Subsequent instruction codes N-OP1, N-EX1U, N-EX1L, N-OP2 are output to the second bus through the first reading out port. The relationship between the selection signal SLPORT2i and the code to be selected is shown in FIG. 14B.

As set forth, according to the present invention, when the instruction code is divided into a plurality of fields and the decoding for one instruction is performed by combining therewith, and if the immediate value or the displacement value inserted with a desired length is input, and since the fields requiring decoding are coupled to transfer to the fixed fields of the decoder input, the efficiency of instruction decoding can be improved.

Such a re-arrangement can be realized using the conventional instruction buffers processing variable length instruction without causing an increase in the amount of hardware. Also, since the random length of the immediate value or displacement value can be aligned to the least significant bit position using such a circuit, it can be expected to reduce the amount of hardware of the immediate generation circuit and the displacement generation circuit, and reduce the number of identification signals for the circuits from the decoder and reduce the hardware associated thereto.

Also, a microprocessor employing the instruction buffer device according to the invention can be made light in weight and compact in size, and can increase the arithmetic processing speed thereby providing an excellent effect.

I claim:

1. An instruction buffer device for processing an instruction code string having at least one basic segment including a code for distinguishing the type of instructions, each basic segment having an expanded segment added depending upon a designation of the basic segment; said basic segment and said expanded segment respectively having lengths a multiple of a predetermined unit length; the length of said expanded segment being variable, said instruction buffer device comprising:

a bus having segments corresponding to the basic segments of an instruction code string and a plurality of segments corresponding to the expanded segments of an instruction code string, the segments corresponding to the basic segment being contiguous, the segments corresponding to the expanded segments being contiguous;

instruction decoder means connected to said bus for simultaneously decoding said instruction code string without a preset delay; and instruction buffer means connected to said bus including:

marking means for marking each unit length of said instruction code string as one of said basic segment and expanded segment;

code reading means for reading said instruction code string;

code storage means for storing said instruction code string;

marking storage means for storing said marking;

an output selection circuit responsive to information from said marking storage means for selecting a predetermined instruction code string from said code storage means for outputting to said instruction decoder means via said bus;

means for identifying the leading position of the instruction code string to be output to said instruction decoder means; and a control circuit that controls the re-arranging of segments in an instruction code string prior to outputting the instruction code string to said bus coupling of one or more codes in the portions in said code string beginning at said leading position, indicated as said basic segments by said marking, in a length not exceeding a predetermined length for outputting to segments of said bus corresponding to a basic segment such that basic segments from different code strings are arranged contiguously on said bus, and to output the portions of said code string beginning from said leading position, indicated as an expanded segment by a marking, to segment, of said bus corresponding to an expanded segment such that expanded segments related to different basic segments are arranged contiguously on said bus.

2. An instruction buffer device as set forth in claim 1, wherein said marking means provides a marking indicating that a basic segment is to be decoded simultaneously with the preceding segment.

3. An instruction buffer device as set forth in claim 1, wherein, upon outputting said instruction code string to said instruction decoder means, said basic segment of said instruction code string is output to said segments in said bus by aligning the most significant bit.

4. An instruction buffer device as set forth in claim 1, wherein upon outputting N sets of basic segments and said expanded segments of said instruction code string to said bus, said control circuit divides said bus into N adjacent segments for the basic segments and N adjacent segments for the expanded segments, and is responsive to information that indicates the order of the corresponding basic segment relative to the first basic segment with respect to the expanded segment, to output the relevant expanded segment to said bus at a predetermined position in said bus.

5. An instruction buffer device as set forth in claim 1, wherein said bus includes N adjacent segments for said basic segments and M adjacent segments for said expanded segments corresponding to the basic section constituted of N instruction code strings and an expanded segment constituted of M instruction code strings that is less than or equal to N; and said control circuit performs a control to determine the output position in said bus for said expanded segment depending upon information indicative of the order of the relevant expanded segment in overall expanded segments upon outputting the instruction code in said expanded segment.

6. An instruction buffer device for processing an instruction code string having at least one basic segment including a code for distinguishing the type of instructions, each basic segment having an expanded segment added depending upon a designation of the basic segment; said basic segment and said expanded segment respectively having lengths a multiple of a predetermined unit length; the length of said expanded segment being variable, said instruction buffer device comprising:

a plurality of instruction decoders for simultaneously decoding a plurality of instructions without preset delays;

a plurality of buses connected to said instruction decoder means, each of said buses being divided into a continuous segment for said basic segments and a continuous segment for each of said expanded segments;

marking means for putting a control marking for each unit length in said instruction code string to identify the basic segment and expanded segment and to determine whether the different basic segments can be decoded simultaneously; and instruction buffer means connected to said buses including:

code reading means for reading said instruction code string;

code storage means for storing said instruction code string;

marking storage means for storing said marking;

identifying means for identifying the leading position for leading out the instruction code to be output to the first one of said instruction decoders; and control circuit that determines whether the basic segment can be processed simultaneously with other basic segments by a common decoder with reference to said control marking, rearranges segments that can be processed simultaneously prior to outputting the basic segments to said bus, assigns the instruction codes of said basic segments in said instruction code string to contiguous locations on said segment on said buses for the basic segments, and assigns instruction codes in said expanded segments in said instruction code string to contiguous locations on said segment on said buses for the expanded segments.

7. An instruction buffer device for processing an instruction code string having at least one basic segment including a code for distinguishing the type of instructions, each basic segment having an expanded segment added depending upon a designation of the basic segment; said basic segment and said expanded segment respectively having lengths a multiple of a predetermined unit length; the length of said expanded segment being variable, said instruction buffer device comprising:

a plurality of instruction decoders for simultaneously decoding a plurality of instruction without a preset delay;

a plurality of buses connected to said instruction decoder means, each of said buses being divided into a continuous segment for said basic segments and a continuous segment for said expanded segments;

marking means for putting a control marking for each unit length in said instruction code string to identify the basic segment and the expanded segment and to determine whether the different basic segments can be decoded simultaneously; and instruction buffer means connected to said buses including:
      code reading means for reading said instruction code strings;
      code storage means for storing said instruction code string;
      marking storage means for storing said marking;
      identifying means for identifying the leading position for leading out the instruction code to be output to the first of said instruction decoders; and a control circuit selecting a first basic segment at the leading position and when a second basic segment among the basic segments following said first basic segment has a marking indicating that the second basic segment cannot be processed simultaneously by a common decoder, outputting the second basic segment mutually independently of the first basic segment a plurality of buses following said first basic segment and when said basic segment has a marking indicating that the second basic segment can be simultaneously processed with the first basic segment by a common decoder outputting the second basic segment simultaneously with the first basic segment, and when each basic segment has an expended segment, outputting the instruction code of the relevant expanded segments to one or more expanded segment in the bus, to which the corresponding basic segment is output.

8. An instruction buffer device as set forth in claim 7 that further comprises an output means for outputting the least significant bit of the instruction code of said expanded segment to the least significant bit of the field for the expanded segment in said bus.

9. A data processing system including an instruction buffer as defined in any one of the preceding claims, wherein the bus is constituted of one or more basic segment fields and one or more expanded segment fields; said decoder includes means for discriminating said expanded segment between an immediate or displacement and detecting the length thereof, and an immediate or displacement generation means, and wherein from the least significant bit of the selected expanded segment field, the code string of the length designated by said decoder is extracted for the generation respectively of immediate or displacement.

10. An instruction buffer as defined in any one of claims 1 to 8 wherein said instruction buffer is formed in a microprocessor.

* * * * *

UNITED STATES PATENT AND TRADEMARK OFFICE
CERTIFICATE OF CORRECTION

PATENT NO. : 5,598,544

DATED : January 28, 1997

INVENTOR(S) : Toshiharu OHSHIMA

It is certified that error appears in the above-indentified patent and that said Letters Patent is hereby corrected as shown below:

Column 1:
    Line 45, after "example", insert -- : -- (colon).
    Line 50, after "pointer", delete ";".
    Line 51, after "pointer", insert -- ; -- (semicolon).
Column 2, line 34, change both occurrences of "bytes" to -- byte --.
Column 3:
    Line 9, after "decoding", insert -- . -- (period).
    Line 33, after "segment", insert -- , -- (comma).
    Line 34, after "instructions", insert -- , -- (comma).
    Line 35, change "expended" to -- expanded --.
    Line 39, change "expended" to -- expanded --.
Column 4:
    Line 7, delete "provided".
    Line 20, after "string" and after "segment", insert -- , -- (comma).
    Line 28, delete ",2(b), 2(d) and" and insert -- through --.
    Line 34, change "diagram" to -- diagrams --.
    Line 35, delete "a".
    Line 64, delete the second occurrence of "8".
Column 5:
    Line 4, after "is", insert -- a partial --.
    Line 6, change "Fig. 8" to -- Figs. 8A-C; --.
    Line 47, change "bites" to -- bytes --.
    Line 48, change "bites" to -- bytes --.
    Line 49, change "bites" to -- bytes --.
    Line 50, change "bites" to -- bytes --.
    Line 52, change "bites" to -- bytes --.
    Line 55, change both occurrences of "bites" to -- bytes --.

UNITED STATES PATENT AND TRADEMARK OFFICE
CERTIFICATE OF CORRECTION

PATENT NO. : 5,598,544

DATED : January 28, 1997

INVENTOR(S) : Toshiharu OHSHIMA

It is certified that error appears in the above-indentified patent and that said Letters Patent is hereby corrected as shown below:

Column 7:
        Line 19, delete "means".
        Line 37, after "immediate", insert -- / --.
        Line 48, change "bites" to -- bytes --.
        Line 63, change " "OO " to -- "OO" --.
    Column 8:
        Line 38, after the second occurrence of "the", insert -- second to the --.
        Lines 39-40, delete "(b) to (d) neglecting (c)" and insert -- the first to the third line --.
  Column 10, line 4, change "us" to -- is --.
    Column 11:
        Line 32, change "bites" to -- bytes --.
        Line 33, change "bites" to -- bytes --.
    Column 11:
        Line 35, change "bites" to -- bytes --.
        Line 36, change "bites" to -- bytes --.
        Line 67, change "Connected" to -- connected --.
    Column 13, line 35, change "oil" to -- of --.
    Column 14:
        Line 9, change "ith" to -- *ith* --.
        Line 20, change "Of" to -- of --.

UNITED STATES PATENT AND TRADEMARK OFFICE
CERTIFICATE OF CORRECTION

PATENT NO. : 5,598,544

DATED : January 28, 1997

INVENTOR(S) : Toshiharu OHSHIMA

It is certified that error appears in the above-indentified patent and that said Letters Patent is hereby corrected as shown below:

Column 17:
    Line 42, after "to", delete "," (comma).
    Line 44, after "out", delete "," (comma).
  Column 18, line 53, change "Subsequent" to -- subsequent --.
  Column 22, line 14, change "expended" to -- expanded --.

Signed and Sealed this

First Day of July, 1997

Attest:

BRUCE LEHMAN

Attesting Officer

Commissioner of Patents and Trademarks